(12) United States Patent
Maim

(10) Patent No.: US 11,861,599 B2
(45) Date of Patent: Jan. 2, 2024

(54) TOKEN-BASED TRANSACTIONAL SYSTEMS AND METHODS

(71) Applicant: Enrico Maim, Sceaux (FR)

(72) Inventor: Enrico Maim, Sceaux (FR)

( * ) Notice: Subject to any disclaimer, the term of this patent is extended or adjusted under 35 U.S.C. 154(b) by 743 days.

(21) Appl. No.: 16/962,195

(22) PCT Filed: Jan. 15, 2019

(86) PCT No.: PCT/IB2019/050295
§ 371 (c)(1),
(2) Date: Jan. 11, 2021

(87) PCT Pub. No.: WO2019/138391
PCT Pub. Date: Jul. 18, 2019

(65) Prior Publication Data
US 2021/0133735 A1    May 6, 2021

Related U.S. Application Data

(60) Provisional application No. 62/784,480, filed on Dec. 23, 2018, provisional application No. 62/750,836, (Continued)

(51) Int. Cl.
*G06Q 20/38* (2012.01)
*G06Q 20/22* (2012.01)

(52) U.S. Cl.
CPC ....... *G06Q 20/3821* (2013.01); *G06Q 20/223* (2013.01); *G06Q 20/29* (2013.01); *G06Q 2220/00* (2013.01)

(58) Field of Classification Search
CPC .. G06Q 20/3821; G06Q 20/223; G06Q 20/29; G06Q 2220/00; G06Q 20/387;
(Continued)

(56) References Cited

U.S. PATENT DOCUMENTS

2017/0287068 A1* 10/2017 Nugent .................. G06Q 20/08
2017/0330202 A1* 11/2017 Wilkes .................. G06Q 30/02

FOREIGN PATENT DOCUMENTS

WO    WO-2018127923 A1 * 7/2018 ............. G06F 21/64

* cited by examiner

*Primary Examiner* — Patrick Mcatee
*Assistant Examiner* — Vincent I Idiake
(74) *Attorney, Agent, or Firm* — WOMBLE BOND DICKINSON (US) LLP

(57) ABSTRACT

The invention proposes a network transactional system, comprising a set of token nodes (TN), a set of user nodes (UN) and a set of provider nodes (PN), the nodes being capable of executing an executable contract for a user node to obtain token account units (Voucher Tokens) by reserving (R) reserve account units according to a value of the token units which itself varies according to the reserve, the number of token units in circulation and the reserve ratio (RR).

A provider node is associated with each token node and the token is representative of a product or asset (good, service, right or other benefit) of the provider, or a group of such products or assets.

When a user node provides account units necessary to obtain token units from a given token node at the current value, the system is capable of transferring a first portion of said reserve account units to the reserve of the given token node, and transferring a second portion of said reserve account units outside the reserve, and performing reverse transfers when token units are returned to the given token node, so as to limit or neutralize the value variations of the token unit when said token units are received and returned.

Application including the generation of interchangeable local tokens without undesirable value variations related to reserve mechanisms such as Bancor.

15 Claims, 6 Drawing Sheets

Related U.S. Application Data filed on Oct. 26, 2018, provisional application No. 62/728,801, filed on Sep. 9, 2018, provisional application No. 62/715,284, filed on Aug. 7, 2018, provisional application No. 62/681,187, filed on Jun. 6, 2018, provisional application No. 62/666,258, filed on May 3, 2018, provisional application No. 62/655,846, filed on Apr. 11, 2018, provisional application No. 62/636,967, filed on Mar. 1, 2018, provisional application No. 62/617,391, filed on Jan. 15, 2018.

(58) Field of Classification Search
CPC .. G06Q 20/3823; G06Q 20/389; G06Q 20/06; H04L 9/50
See application file for complete search history.

TOKEN-BASED TRANSACTIONAL SYSTEMS AND METHODS

FIELD OF THE INVENTION

The present invention relates generally to electronic methods and systems for carrying out transactions involving assets based on reserve units from which "tokens" are generated.

PRIOR ART

Nowadays, the execution of "smart contracts" is growing, owing to the ability of a processing unit to execute a contract that one can be certain has not been altered by software attack or by physical attack, nor by a third party or by the owner of the unit in question. This enables trusted exchanges between different processing units. Trust exchange applications are developing in many fields, from financial to legal, including logistics, etc.

In particular, there are known smart contracts making it possible to generate tokens by reserving currency or cryptocurrency account units, where these tokens can have different kinds of counterparts.

Various electronic means are already known that serve as currency to allow the party delivering goods or services to later order other goods or services that he desires on the market.

It would be desirable for any person who offers goods or services for sale on the market at published and competitive prices to have a means of automatic, decentralized transmission, without the involvement of a third party other than his customer, of an automatic currency, at least when these goods and services are requested on a daily basis.

However, such an abundant and directly available currency to provide the mediation necessary for exchanges does not exist in generalizable form.

We are certainly familiar with the vouchers issued by a provider, for example in the form of tokens—a customer buys such a token from the provider, which the latter will later redeem for a good or service, and thereby benefit from a discount —, but it is easy to end up holding too many tokens from some providers and not enough tokens from others. The limitations of this system become apparent when one cannot convert excess tokens into the tokens that are lacking. Such tokens could serve as currency if they were interchangeable.

However, such an ability of vouchers to be interchanged raises the difficulty that a given provider could simply issue as many vouchers as he wished, and then exchange them with vouchers for other supplies and thereby obtain unlimited different types of goods and services.

Bancor (see https://bancor.network) would allow one such token to be exchanged for another in a transparent manner by reserving reserve account units.

It will be recalled that Bancor introduced the purchase/sale of token units without the need for compensation. The price P of a token unit is given by the formula $P=R/(S*RR)$ (called "Bancor formula" below), where:

R is the reserve (analogous to the fractional reserve that a deposit bank must keep to have enough cash in the event that a large number of depositors come to withdraw their money at the same time—here the token serves as deposit receipt, but at the same time is tradable in itself on the market and has a variable value), S (like "Supply") is the quantity of token units that are in circulation, and RR is a "Reserve Ratio" value, which in principle is decided upon the creation of the token and which is normally a constant, reflecting the fact that the more we buy, the more the price goes up (in reserve units, for example in Ethereum units, ethers (ETH)), and conversely the more we sell, the more it goes down. Each token can in turn serve as reserve for new tokens. This model is described in Bancor's White Paper: https://about.bancornetwork/static/bancor_protocol_whitepaper_en.pdf incorporated here by reference—note that in the most recent version of this White Paper, R is called "Connector Balance" and RR is called "Connector Weight," better reflecting that the tokens serving as reserves are generally common to different tokens and thus serve to "connect" them so that they are convertible relative to one another; these are "connectors."

However, if one wants a token in a system like Bancor to act as a "voucher" (such as a gift voucher) representing an asset or product from the real world, this raises several difficulties.

First difficulty, the fact that its value increases with each purchase. Indeed, when a seller puts a set of vouchers on the market (voucher in the broadest sense, for example by offering a discount compared to the value of the corresponding product—good, service, right or another benefit—on the market), it is expected that all of these vouchers will have the same price regardless of the order in which they were purchased by customers, while tokens have a value that evolves with each transaction.

Second difficulty, since tokens must be generated (automatically during their purchases) without limitation—because the fluctuations in the price of a token on the external market (on the various exchange marketplaces, the many "exchanges") can be taken into account through arbitrage operations (see the white paper previously cited) and this requires that tokens be generated in an unlimited manner (as long as there are purchases), in fact, a ceiling in generating them would mean that arbitrage with external markets ceases to be possible as soon as the ceiling is reached—tokens cannot represent a limited set of assets (real world resources).

Finally, the vouchers must be linked to the assets they represent. For a voucher which, by definition, represents an underlying asset in real world goods or services, a variation in the value of the underlying asset must be directly reflected in the value of the token, which is not automatically the case with the tokens of a system like Bancor.

These tokens cannot represent vouchers. However, the potential applications with voucher tokens would be numerous. Voucher tokens could represent assets (i.e. a good or service, or a share of ownership in these goods or services or in legal entities capable of providing or holding these goods or services), such as:

money issued by a bank or central bank;
shares in a company (equity);
intellectual property titles or parts thereof;
goods in limited quantities (such as gold);
vouchers (gift vouchers; "self-issued credit" or "IOU" (I Owe You) as presented in the video https://www.youtube.com/watch?v=RrawbYEZm_M) for a product deliverable in the future and whose production may be limited in time—the voucher may advantageously include preferential delivery dates and bonuses (additional quantities, or other benefits) associated with these dates.

Assets represented by voucher tokens would have the advantage of being able to be taken into account and manipulated in smart contracts, in new types of cooperation.

In addition, there are already known currency systems making it possible to create currencies, for example local currencies usable by communities. See in particular the literature written by Bernard Lietaer, Belgium, on complementary currencies.

These currencies amount to generating credit for economic actors. When credits are generated a priori, they are generated based on an estimate of demand and actual supply, possibly based on certain possible allocations of supply to estimated demand. These estimates are thus tainted with error; certain actors are left with a surplus with respect to purchases that they expected to make locally, and when such an actor wishes to convert this surplus into another currency, for example into a currency ("community currency") of a second community, this will negatively affect the value of the currency of the credit, thus negatively impacting the whole of the first community.

For example, if the currency in question is generated according to the "Bancor" model, this exchange with another currency will imply a decrease in the reserve and therefore a decrease in the value of the currency.

It would be more advantageous if it were instead vouchers that were generated as credits (provided that the difficulties mentioned above were addressed) and that there was no longer any need for credit issuers (such as banks) apart from the buyers themselves, so that credits are generated based on actual demand (rather than estimates) and credit risk is taken by buyers rather than the community. It would also be advantageous to remove the geographical limitation presented by current solutions using complementary currencies.

SUMMARY OF THE INVENTION

According to one aspect, based on a model with reserve such as the Bancor model, where different types of tokens represent different types of assets or products, we aim to control the variations in the value of tokens during transactions inherent in the Bancor model.

This would make an existing mechanism, which is essentially speculative, fundamentally useful for enabling communities to develop local currencies or other fiduciary elements without variations in parasitic values, and in a perfectly interchangeable manner.

A network transactional system is thus proposed, comprising a set of token nodes, a set of user nodes and a set of provider nodes, the nodes being capable of executing a smart contract enabling a user node to obtain token account units (Voucher tokens) by reserving reserve account units according to a value of the token units which itself varies according to the reserve, the number of token units in circulation and the reserve ratio, with each token node being associated with a provider node and the token being representative of a product or asset (good, service, right or other benefit) of the provider, or of a group of such products or assets, the system being capable, when a user node provides reserve account units necessary to obtain token units from a given token node at the current value, of transferring a first portion of these reserve account units to the reserve of the given token node, and transferring a second portion of these reserve account units outside the reserve, and performing reverse transfers when token units are returned to the given token node, so as to limit or neutralize the value variations of the token unit when these token units are received and returned.

Obtained token account units (sometimes shortened to "token units" in the following) can generate a supply commitment from the provider who owns the provider node and in a way constitute a voucher. However, they are only generated upon an actual request by a user and not at the initiative of the provider, as is the case for a traditional voucher. The "fraud" that would consist of the provider himself obtaining token units from the associated token node (therefore generating false orders) would be absurd here because (thanks to the execution integrity of smart contracts) this provider would have to pay for his token at the same price (P) as his customers. Moreover, in the case where for most of the providers (sub-contractors, etc.) of the provider in question, only the tokens associated with these providers make it possible to buy from them, blocking reserve units in order to generate units of his own token would prevent him from using these same reserve units (insofar as they are the same as for his own providers and serve as connector) in order to obtain the supplies that he himself needs.

In this regard, the use of a token system for the providers own supplies is virtuous in that it allows reciprocity circuits to be detected and to cause automatic rebates or even, in the particular case where an indirect barter circuit is detected, not to have to block reserve units at all, when purchasing token units—and providers will therefore benefit from adopting it by creating their own token.

The invention also makes it possible to generate credit for an actor not according to estimates, but according to actual current and future demand.

Certain preferred but non-limiting aspects of this system include the following features, taken individually or in any technically compatible combinations:

the system is adapted, during the supply of a product of the good or service type by the provider, to delete the corresponding token units by transferring the first portion of the reserve account units to the provider node and, if it has not already been transferred there, the second portion of the reserve units;

the system also includes product delivery certification nodes capable of communicating with the token nodes to selectively delete all or part of the token units and to transfer all or part of the first portion of the reserve account units to the provider node and, if it has not already been transferred there, the second portion of the reserve units, according to a verified or certified supply status of the product corresponding to a user;

the system also comprises, at a user node, means capable of causing units of a certain token associated with this location to be received in response to geographic location information.

the system includes means for loading a smart contract into the user node in question enabling this reception.

said units of the certain token are associated with time data, such as a period of validity.

the fraction of account units defining said first portion is variable, so as to vary the price of the certain token associated with the location, in particular for regulatory purposes.

the certificate of delivery node and the user node of the concerned user form a single node;

the product consists of a right to use the given token as a reserve account unit for token nodes of other tokens;

said second portion of the reserve account units is transferred at least in part to the provider node;

the smart contract executed in a token node is capable, prior to a return of token units to the given token node, of verifying the availability of the reserve account units that had been transferred to the provider node when receiving these token units and, based on this verification, performing the return within the limit of the available reserve account units, and is also capable of assigning the provider node an attribute of remaining debt of reserve account units in the event of at least partial unavailability;

the smart contract is adapted, during a subsequent transaction providing for a transfer of reserve account units to a provider node having such an attribute of remaining debt, to transfer all or part of the reserve account units to be transferred for this subsequent transaction to the user node at the origin of said return, to at least partially complete the latter;

the system includes means for associating the attributes of the remaining debt of the provider nodes with other attributes of these nodes, so as to dissociate these attributes from the key pairs of said nodes;

said second portion of the reserve account units is transferred at least in part to an escrow account;

the escrow account is managed within the given token node;

the number of reserve account units of the first portion is chosen to neutralize the value variations of the token units when they are received and returned;

the token node is adapted to compare the number of token units received by user nodes with a variable availability threshold and, if this threshold is exceeded, to modify the allocation of the new reserve account units made available between first and second portion;

the modified allocation has a second portion with zero reserve account units;

the given token node is adapted to mark the token units generated beyond said threshold so that they form an availability waiting list, and to remove this marking as the said threshold increases;

the availability threshold is determined from a quantity of assets associated with the provider node and a given asset blocking ratio;

the availability threshold is determined by a smart contract at the provider node or the token node, sensitive to information supplied by asset blocking sensor means;

the system includes means for modifying the value of the availability threshold and/or the conversion value of the Voucher tokens into assets in response to a decrease (generally outside control) in the number of assets from which the initial availability threshold was established;

the provider is adapted to supply fixed quantities of product constituting a reference good (such as metal gold), these fixed quantities of the reference good thus serving as real money;

the system includes means for managing priorities in the waiting list;

the priority management means are adapted to take account of micropayments made with the token considered by different users having tokens on the waiting list;

the system further comprises, at a provider node or a token node, secure means for certifying a blockage or an generation of assets (typically sensor means managed by a smart contract), cooperating with the means for generating the availability threshold for the asset in question;

the first portion of the reserve account units consists of a first sub-portion, the number of which is such that they would neutralize the value variations of the token units when they are received and returned, and a second sub-portion, the number of which is such that they generate a controlled value variation of the token unit, with an increase when received and a decrease when returned;

the number of reserve account units in the second sub-portion is determined according to a variable parameter (IH) associated with the token and managed by its token node;

the parameter is a function of time data relating to the demand for supplies and the supply of supplies at the provider node;

the parameter is a function of a density and/or a distribution of possible supply instants in one or more time intervals where the supply is requested;

the parameter is a function of population data from different user nodes that have obtained associated token units;

the population data of user nodes are weighted by consistency data, between these nodes, with respect to token units of other types that they have obtained (compliance);

the parameter is a function of reliability data for the supply of products corresponding to the considered token;

the parameter is a function of at least two of the data;

a token node is adapted, in the event of variation of said parameter, to redistribute the allocation of reserve account units to its first portion and its second portion by transfer from outside the reserve to the reserve or vice versa;

the system further comprises means for automatically causing token units to be received at a given token node in response to a reported change in the asset underlying this token unit, so as to adjust the value of the token unit on the value of the underlying asset that has varied;

the variation is signaled by detection of a variation in the quantity of a physical asset constituting the underlying asset;

the system includes secure means (such as sensor means managed by a smart contract) to detect said variation;

the change is indicated by detection of the value variation of an intangible asset constituting the underlying asset;

the system includes secure communication means, managed by a smart contract, with a data source capable of providing the value of the intangible asset;

the token units for a given token node are capable of being converted into supplies of products or reserve units previously blocked in blocked assets, and the system further comprises means for determining a number of token units to obtain in order to be supplied with a given quantity of products or reserve units previously blocked as a function of data on probabilities of events triggering such a supply, at least a portion of the reserve account units which have made it possible to obtain the token units being transferred to the provider node of the products and/or to the blocked assets;

the system further comprises means capable, in response to the occurrence of a triggering event, of converting token units of a given token into a supply of products or reserve account units previously blocked in blocked assets, and means for determining a number of token units to be obtained in order to be supplied with a given quantity of products or reserve account units previously blocked as a function of data on probabilities of events triggering such a supply, at least a portion of the reserve account units that made it possible to acquire the token units being transferred to the provider node of the products and/or to the blocked assets;

said number of token units to be acquired varies according to the probability of a triggering event occurring according to an increasing law;

the transfer of reserve account units to the product provider node constitutes a deposit, the additional reserve account units being transferred to the provider from the reserve (R) during the supply of the product upon a triggering event;

the transfer of reserve account units to the provider node of blocked reserve account units participates in the generation of blocked assets, the additional reserve account units being transferred to the user node from the reserve (R) when the assets are released upon a triggering event;

said probability data are established based on existing statistical data linked to triggering events;

said probability data are adjusted by statistical learning;

the tokens of at least one token node are support tokens capable of being converted into support supplies when triggering events occur, the system comprising means for managing suitable reserve account units capable, when receiving additional support tokens compared to a starting situation:
  of blocking at least a portion of the reserve account units received for this acquisition, without allocating it to the reserve,
  of distributing these blocked reserve account units with the various token support receivers (user nodes who are beneficiaries of the support commitment) based on the occurrence of triggering events;

the system further comprises means for transferring account units from a given token (first token), in response to an increase in utility or use of a network of token nodes having this given token as reserve unit, towards the reserve of token nodes contributing to this increase;

the increase in utility or use of the network is determined by at least one of the following factors:
  an intention to purchase a good or service, materialized by the purchase of units of a specific token (second token) by reserving the given token,
  an offer for sale of a good or service with a specific token that can be obtained by reserving the given token,
  the actual purchase of the good or service,
  the conversion of the specific token into a Voucher token for exchange with the good or service,
  increasing the availability threshold for the specific token into Voucher token;

the system further comprises means for generating offers and requests for tokens of other types in at least certain token nodes, and means for managing a token exchange market based on said offers and requests and configuring the network to optimize exchange transactions;

the system further comprises means for transferring reserve account units between token nodes in a controlled manner so as to act on the values of the token units via their respective reserves by attenuating the fluctuations of said values caused by the token receiving and return transactions (reciprocity);

the reserve account unit transfer means are capable of controlling the quantities of reserve units transferred according to scores established for each token;

the score for a given token is linked to the significance of the transactions performed on the token in question;

the significance of transactions on a given token is determined based on at least one of the following factors: the volume in account units of transactions of the given token, the number of user nodes triggering transactions of token units, the age of the transactions of the given token, the value variations of the token that would be obtained by applying a gross reserve rule (where all reserve account units go into the reserve);

the scores are determined by iterations on increasingly large sets of token nodes and user nodes based on links between such nodes;

the links are formed by the transactions;

a transfer from reserve to token node is carried out only if the score of the latter is above a threshold;

the quantity of reserve units transferred to a token node is determined according to the score of the latter;

a score is higher the more recent the transactions of the given token are;

the system is implemented in a decentralized peer-to-peer manner by processing integrated into the token nodes;

the system further comprises means for simulating controlled transfers of reserve account units between token nodes so as to obtain simulated values of the token units corresponding to their respective simulated reserve, said simulated values having attenuated fluctuations, and means for carrying out transactions on said simulated values;

the simulated values are weighted by tribe scores;

the means for carrying out transactions on said simulated values are capable of determining price adjustments based on differences between real values and simulated values, and of compensating for all of the adjustments;

a first provider node associated with a token node of a first token is a provider node with respect to a first user node that is also a second provider node associated with a token node of a second token, and the system further includes means for determining the existence or prospect of existence of reverse transactions where the first provider node would be a user node at one end and the second provider node would be a provider at the other end, if applicable via other provider nodes, and, depending on the characteristics of these actual or planned reverse transactions, transferring a given quantity first token units to the first user node from the first provider node in return for a simple transfer of reserve account units corresponding to this given quantity of first token units, in order to allocate this payment to the reserve;

for the other user nodes, the first token account units are obtained for their real value (P);

the volume and frequency of transfers of account units in return for reserve account units are only linked to the volume and frequency of transactions in the reverse transaction chain;

the system includes means for modulating the amount of the transfer between the reserve value and the real value as a function of the length of the chain of reverse transactions;

the determination of the existence or a prospect of existence of reverse transactions where the first provider node would be a user node at one end and the second provider node would be provider at the other end, if necessary via other provider nodes, is implemented with "pretoken" type tokens that do not require reserving reserve account units.

the system comprises means for requesting the receiving of tokens by reserving reserve account units when no expected chain of reverse transactions with pretokens is detected.

a token node and an associated provider node consist of one and the same node.

The invention also provides methods comprising combinations of steps implemented by the above systems.

BRIEF DESCRIPTION OF THE DRAWINGS

The invention will be better understood on reading the following detailed description of preferred embodiments thereof, given by way of non-limiting example and done in reference to the accompanying drawings, in which.

DETAILED DESCRIPTION OF PREFERRED EMBODIMENTS

Definitions

Figure 1:
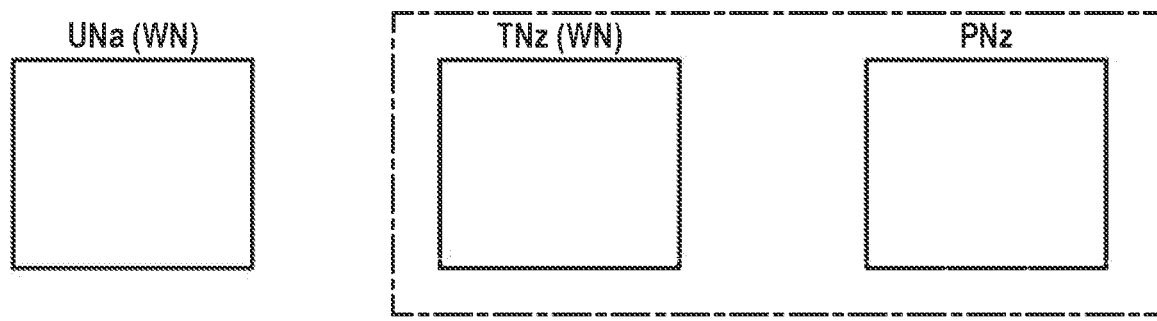
FIG. 1 illustrates the basic architecture of a system according to the invention.
Figure 1:
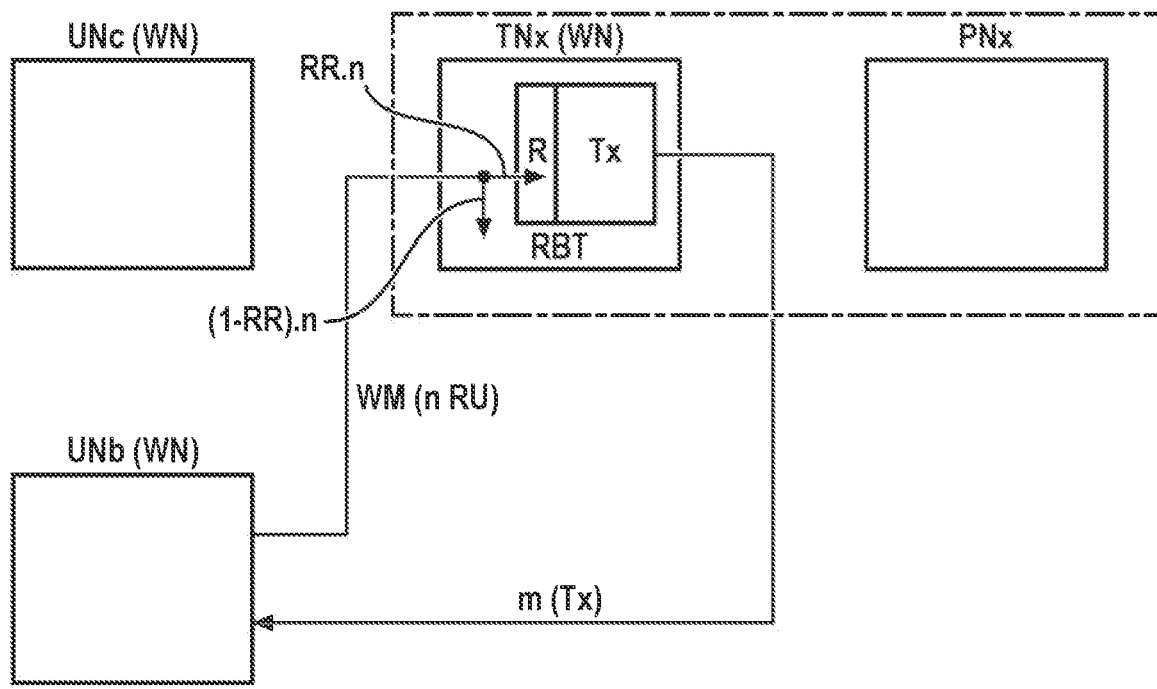
Figure 1:
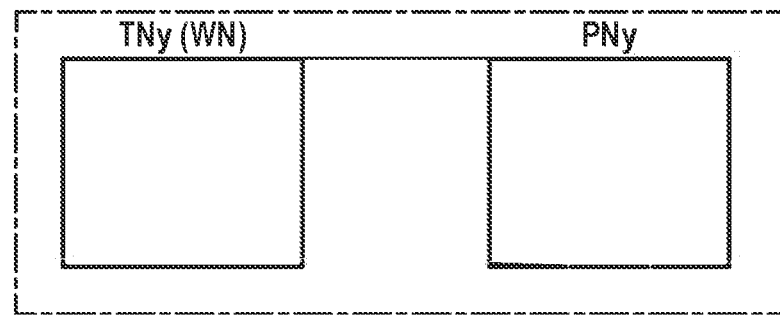

A "smart contract" in particular refers to a "wallet program" within the meaning of document WO2016120826A2 incorporated here by reference or a "smart contract" (on the blockchain, such as an Ethereum smart contract), or another means, which implements it with equivalent functionality.

A "tokennode" or "generatornode/token manager," or even "token transmitternode" refers to the node of a peer-to-peer network (i.e. the terminal connected to the network) executing the smart contract to manage the token in question, in particular to generate (issue) token units when reserving reserve units.

When we talk about the purchase (of units) of a given token, we mean the conversion, into this given token, (of units) of the reserve token of this given token.

When we talk about the sale (of units) of a token, we mean its conversion into (units of) its reserve token (the token is "returned" to the smart contract of the tokennode of the token in question).

A "usernode" (or "user") generally refers to a node sending a tokennode an order to buy/sell token units against reserve units.

A tokennode is implemented according to a method comprising determining the value of the token units as a function at least of the value of the reserve, the tokens in circulation and the reserve ratio (hereinafter "RBT method", RBT for "Reserve-Based-Token"). It can be a method according to the "Bancor" protocol, or a method according to another protocol (on this subject, see the explanations at https://www.blunderingcode.com/how-bancor-works/). The embodiments presented in the following are intended to provide improvements.

Whenever a user node exchanges one or a set of first tokens (from one or more first issuers) with a second token or a set of second tokens (from one or more second issuers), managed by respective token nodes, for example to acquire a product from a provider associated with a transmitternode of a second token (in the case where he does not have enough second tokens for this purchase at the moment), the first token(s) are sold and the second token(s) are bought at their respective token nodes —this being implementable in a transparent manner for the user—and this causes a decrease in value of the first tokens and an increase in value of the second tokens (according to the "RBT method," for example according to the Bancor formula).

A "provider node" (which may be abbreviated as "provider") refers to the terminal of the product provider (good, service, right or other benefit) executing the smart contract and interacting with the corresponding tokennode, the latter advantageously being implementable in a single node (merged). For the sake of brevity, the term "providernode" or "tokennode" refers to such a merged node, but this is not limiting. Furthermore, we consider here that each tokennode only corresponds to one providernode, but this is not limiting either, the mechanisms described remaining valid otherwise (in particular several provider nodes may be managed by a common intermediate node that distributes the units transferred from user nodes to the various providers according to the products to be supplied to them, manages refunds, etc.). We will thus use the terms "token node" and "provider node" interchangeably, unless there is a specific context.

The integrity of the execution (by nodes) of smart contracts implementing the procedures described in this text is guaranteed insofar as the nodes in question (user, provider and token generator/manager) execute the same smart contract or another set of smart contracts that cooperate by Wallet Messages so as to form a global smart contract together (see the description of "Wallet Nodes" and "Wallet Messages" for example in WO2016120826A2). This security, where the different owners of the nodes cannot modify the behavior, is essential for the implementation of the systems of the invention.

To acquire a product from the issuer of a given token, a user node generally transfers units of this given token to it, up to the amount of the purchase in question, and ultimately these units are "burned," that is to say eliminated, in return for reserve units given to the provider.

For the sake of brevity, the following describes exchanges of tokens whose reserves are of the same type (when the type of reserves used in an exchange is not specified, it is understood that these are reserve units—also called reserve account units—of the same token), conversion steps being necessary in addition otherwise. These conversions can be carried out automatically according to the RBT method (for example according to the Bancor formula) or on the market, in particular as described below.

Also for the sake of brevity, unless otherwise noted, the tokens have a list price equal to 1 (i.e. 1 unit of the token is worth 1 unit of its reserve token), but this is only taken as an example, and the transition in the case where price is different is trivial for the skilled person.

Chapter I—Introduction

The system of this invention is a network transactional system, comprising a set of token nodes, a set of user nodes and a set of provider nodes, the nodes being capable of executing a smart contract allowing a user node to obtain token account units (Voucher tokens) by reserving reserve account units according to a value of the token units which itself varies according to the reserve, the number of token units in circulation and the reserve ratio, with each token node being associated with a provider node and the token being representative of a product or asset (good, service, right or other benefit) of the provider, or of a group of such products or assets, the system being capable, when a user node provides reserve account units necessary to obtain token units from a given token node at the current value, of transferring a first portion of these reserve account units to the reserve of said given token node, and of transferring a second portion of these reserve account units outside said reserve, and performing reverse transfers when token units are returned to the given token node, so as to limit or neutralize the value variations of the token unit when these token units are received and returned.

It makes it possible to generate credit (in the form of a token) automatically for an economic actor not according to estimates, but according to actual current and future demand, the account units of the credit (although specifically named for the token of the credit in question) being interchangeable with the account units of another credit (another token) according to an RBT method.

Owing to this system, each of the providers of a market is associated with a unique token transmitternode (for example "tomato" token to obtain tomatoes) and the units of this token are generated only on actual demand, for immediate or deferred supply of products, in exchange for a common reserve currency (which acts as an intermediary for conversions between tokens according to the RBT method).

It should be noted here that the passage through the reserve currency can be transparent: the conversion between tokens, carried out by their respective token nodes by converting them to/from a reserve token, can be done transparently for the user.

This thus avoids the problem of the decrease in value of a shared local currency due to surpluses to be converted into other currencies, since it is through the actual expression of the needs of each buyer that the system decides to allocate credits (rather than a credit issuer such as a bank, which would base itself on estimates).

It is thus a currency of the self-issued credit type (in the form of vouchers), but with the advantage that when a buyer has too many units of a certain currency and not enough of another, he can exchange them automatically owing to their automatic convertibility via their respective reserves (using the RBT method).

The implementation of the token nodes generating the token account units will be described in more detail below.

This invention can be applied not only to the supply of products in exchange for corresponding tokens (these are vouchers generated when a demand is expressed), but also all kinds of "vouchers" such as gift cards, consumer credit, insurance benefits with consumption constraints (e.g. required car mechanic), coupons, loyalty systems, etc.

Referring to FIG. 1, such a system is shown schematically, with user nodes UNa, UNb, UNc, . . . token nodes TNx, TNy, TNz, . . . and provider nodes PNx, PNy, PNz, . . . .

A token node TNx is associated with a provider node PNx. They can be combined.

The smart contract executed in the node TNx executes an RBT method in order to generate token units Tx by reserving reserve units RU.

In the present example, each node is capable of securely executing a program defining a smart contract, and is for example a "Wallet Node" within the meaning of document WO2016120826A2.

Token units Tx are obtained here by a user node UNb via a message (for example a "Wallet Message" within the meaning of WO2016120826A2) which transfers a certain number n of reserve account units RU to the considered token node TNx.

The smart contract executed in the TNx node assigns a fraction of these RU units (either a fraction equal to the reserve rate RR, or a different fraction as one will see below) to the reserve of the token Tx, to generate a number m of Tx tokens corresponding to this fraction, depending on the price of the token.

On the other hand, the remaining fraction of the received units RU is not allocated to the reserve, but transferred in different ways according to the different embodiments that will now be described.

Chapter 2—Conversion of Tokens into Voucher Tokens in Limited Quantity, with Waiting List Management The following additional features are provided here:
first, the number of reserve account units of the first portion is chosen to neutralize the value variations of the token units when they are received and returned;
a token node is adapted to compare the number of token units received by user nodes with a variable availability threshold and, if this threshold is exceeded, to modify the allocation of the new reserve account units made available between first and second portion;
this modified allocation has a second portion with zero reserve account units;
the given token node is adapted to mark the token units generated beyond said threshold so that they form an availability waiting list, and to remove this marking as the said threshold increases;
This availability threshold is determined from a quantity of assets associated with the provider node and a given asset blocking ratio, this determination obeying a linear or nonlinear law;
this availability threshold is determined by a smart contract at the provider node or the token node, sensitive to information supplied by asset blocking sensor means;
Lastly, the system may include means for modifying the value of the availability threshold and/or the conversion value of the Voucher tokens into assets in response to a decrease (generally outside control) in the number of assets from which the initial availability threshold was established.

In more detail, we propose here a model of executable contracts to issue vouchers in the form of RBT tokens convertible into assets, in limited quantity or in a controlled manner over time—model based on smart contracts such as Ethereum smart contacts or Wallet Nodes executing Wallet Programs communicating with one another by Wallet Messages (within the meaning of WO2016120826A2), executable contracts guaranteeing authenticity and integrity of execution and making it possible, in a Bancor-type approach (but not limited to the tokens of the ERC20 standard), to acquire or sell token account units in return for any type of virtual account units intended as a reserve (for example cryptocurrencies issued by a bank or government or stablecoins within the meaning of https://www.dob.texas.gov/ pubile/uploads/files/Laws-Regulations/New-Actions/sm1037.pdf which states (sic) that "a sovereign-backed stablecoin may be considered money or monetary value under the Money Services Act, receiving it in exchange for a promise to make it available at a later time or different location may be money transmission").

This embodiment aims to make the vouchers exchangeable relative to one another (indirectly through reserve units) and thus to allow them to be used as money. Indeed, the system of the invention allows the user to use a voucher issued by a given provider to buy even a product from another provider, the conversion from one voucher to another being done transparently.

Tokens are the support for vouchers (and they are called "voucher tokens" when they take ownership of a "voucher"), but when vouchers are themselves manipulated (bought, returned for supplies (redeemed), sold, etc.), the proposed model makes the support tokens transparent for the user.

Behavior of a Token

As already mentioned, the concept of token is distinguished here from that of "Voucher." A token is an account unit generated by a smart contract according to formulas such as those presented in the aforementioned White Paper (Bancor formula). A voucher is the representation of a finite resource (asset) from the real world, such as a gift voucher.

Figure 2A:
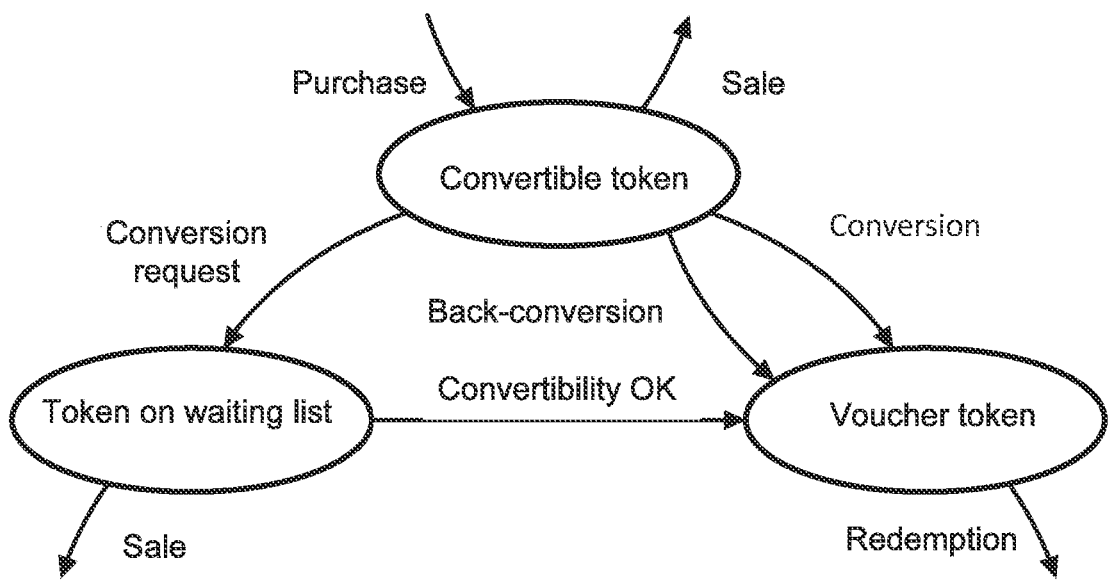
FIG. 2A is a diagram of states/transitions illustrating an embodiment of the invention with conversion of tokens into Voucher tokens in limited quantity and management of a waiting list.

The voucher units are linked to the token units by assigning a "voucher" property to them (or "marking"), or by other equivalent means (table management, for example). To introduce this notion of marking, FIG. 2A shows a transition state diagram that describes the behavior of a considered unit of a given token. (It should be noted that any quantity of units of a given token, even with decimals, can be manipulated at the same time—to be more precise, later we will speak of m reserve units received for generated tokens (i.e. the number of token units generated divided by their price expressed in reserve units), n reserve units corresponding to those marked voucher, r units corresponding to those which are redeemed in exchange for delivery of the asset, etc.)

In this transition state diagram, the initial entry into the "Convertible Token" state (i.e. the generation of the token unit by the smart contract) is due to the "Buy" transition (that is to say the purchase of the token unit, see the White Paper cited above).

The "Conversion" transition switches the unit to the "Voucher Token" state (with corresponding marking) if the convertibility threshold is not reached, and the "Conversion Request" transition switches it to the "Waiting List Token" state—that is to say "in waiting list" (priority list), with corresponding marking—if the convertibility threshold has been exceeded.

A "Convertibility OK" transition (from "Waiting List Token" to "Voucher Token") is triggered automatically when the threshold value allows it again and the token can leave the waiting list favorably (the marking being changed accordingly).

The "Back Conversion" transition means the return to the "Convertible Token" state.

Finally, the unit is deleted (burned) during a "Sell" transition (that is to say, the unit is returned to the smart contract, see the White Paper cited above) or an "Exert" transition (by which the supply corresponding to the voucher takes place).

Behavior of the Price of the Token During these Transitions

Figure 2B:
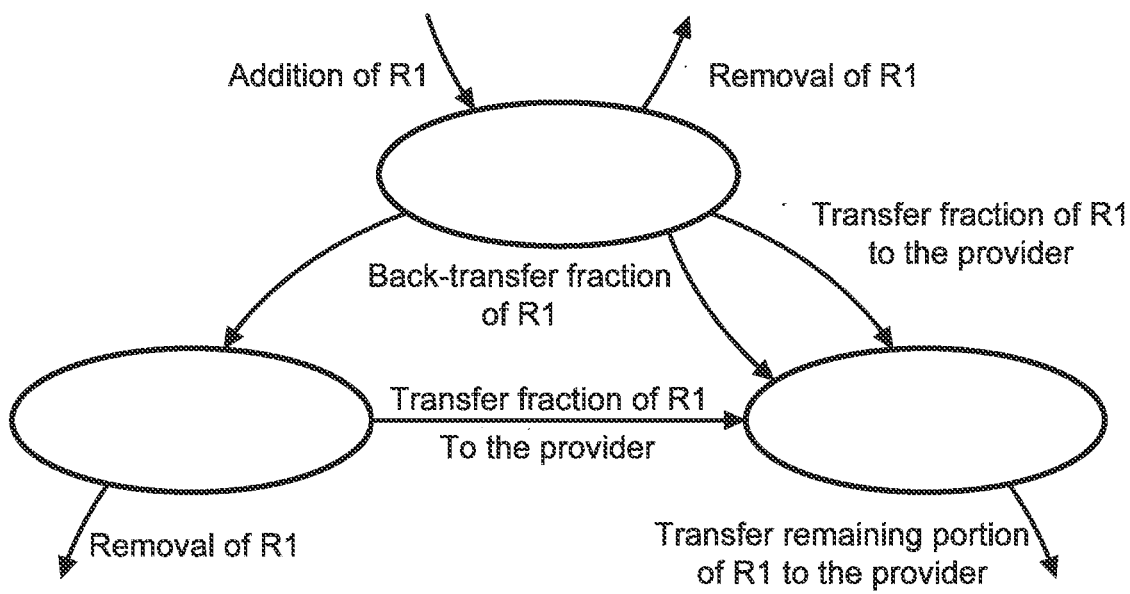
FIG. 2B illustrates the unit flows occurring during the transitions of the diagram in FIG. 1.

Referring to FIG. 2B, when generating "Convertible Token" units, the token node here received m reserve units (for example m ETH) according to its current price. Its price was then increased like in the Bancor model (see the White Paper cited above).

A transition of some of these units from "Convertible Token" to "Voucher Token" (here up to n reserve units) compensates for this increase (in a proportion of n/m) because, according to one aspect of the invention, the voucher provider then withdraws $(1-RR)*n$ reserve units (only $RR*n$ remaining in reserve).

When the voucher is redeemed ("Exert" transition), the $RR*n$ complement which had remained in reserve is transferred to the providernode and the corresponding token units are deleted (burned). In the end, this means that the price of the token remains stable when buying Convertible Token units followed by their conversion and then their exercise.

Conversely, if Voucher Tokens are "deconverted" for v reserve units ("Back Conversion" transition), subject to any conditions for deconversion, the providernode returns to the tokennode $(1-RR)*v$ units of reserve units that it had received during the conversion (or with a different rule, determined in the smart contract) and the price of the token increases again accordingly.

In one possible implementation in a smart contract, the convertible token can be subject to the following nine transitions:

1. Init: When creating a new convertible token T, the quantities R (reserve) and S (supply) are initialized—this can be done by adding (from the node of the user who creates the token) to the tokennode (managing the new token in question) of a first quantity (R) of reserve units and the corresponding generation (according to the RR set and the desired initial price, for example: 1 token unit=1 reserve unit) of an initial quantity (S) of units of T.

2. Buy: Subsequently, the reception by the tokennode of reserve units from the node of a user who purchases units of T causes the generation of a corresponding amount of units of T (which are sent by the tokennode to the node of this user). R, S and P increase accordingly based on the same principle as the Bancor model (see the White Paper cited above).

3. Sell: the return of units of T (by a usernode, to the tokennode) causes the sending (in return, by the tokennode to the usernode) of a corresponding quantity of reserve units (according to the current price of T) and said units of T returned to the tokennode are deleted by the latter (burned). S, R and P decrease accordingly (see the White Paper cited above). This transition requires that the units in question are not marked "voucher" (or a Back Conversion transition—where a transition from the sale of units marked "voucher" can be provided elsewhere).

4. Conversion: at the request of a user node and insofar as the convertibility threshold is not reached, a given quantity of T units are marked "voucher" by the tokennode (with attributes depending on the application, such as time-dependent bonus, etc.). When units of T are marked up to n reserve units, the price P of T decreases so as to compensate for the increase which their purchase had caused during the "Buy" transition: the node of the provider receives $(1-RR)*n$ reserve units (and will receive the complement $(RR*n)$ when supplied—see Exert transition). (Advantageously, and with reference to chapter 9, it is notably on this transition, that is to say when purchased token units are marked "voucher," that these purchases feed the system of chapter 9, which we recall involves triggering reserve token loans).

5. Conversion Request: in the event that the availability threshold of available vouchers is already reached, the units are marked "on waiting list" by the tokennode by assigning them a sequence number (or "priority") to manage priorities. (Advantageously, with reference to chapter 9, it is notably on this transition, that is to say when purchased token units are marked "on the waiting list," that these purchases feed the system of chapter 9 (which, let it be recalled, consists of triggering loans of reserve tokens), thus creating an interesting combination of the two embodiments.)

6. Convertibility OK: for these units on the waiting list, as their turn arrives (at T), this "on waiting list" marking is replaced at the tokennode by a "voucher" marking, and the provider node receives (1−RR)*n reserve units (as in the "Conversion" transition described above). (Advantageously, with reference to the embodiment of chapter 9 below, this transition results in delivering (returning) the units loaned during the Conversion or Conversion Request transition.)

7. Exert: T units marked vouchers up to r reserve units are returned to the tokennode in exchange for supply. Then, as already mentioned above, RR*r reserve units are transferred to the providers node by the tokennode and said r units of T marked "voucher" are deleted (burned) by the tokennode. The price P of the token therefore does not vary.

8. Back Conversion: Request from the node of a user who had done a Conversion on units of T and who is now triggering a reverse transition up to v units of reserve. Then these units cease to be marked "vouchers" and the providernode returns to the tokennode (1−RR)*v reserve units among the (1−RR)*n that it had received on this occasion (or only in part, according to the smart contract), which results in increasing the price of T again (the returned units being added to the reserve). This transition then allows a Sell transition of the unconverted token. Note here that a reverse Conversion Request transition, with no movement of reserve units this time, must also be provided to remove the units (or a portion of the units) from the waiting list.

9. Termination: Finally, when all of the units of T are deleted (burned), the token is supposed to end (see the White Paper cited above).

Advantageously, a tokennode can automate a voucher transfer market between users: token units marked "voucher" or "on waiting list" can be associated with an amount (for example in reserve units) that their owner (usernode) is prepared to accept to give them away. The receipt of this amount by the latter for the token units in question automatically triggers the transfer of these token units to the node (user) which paid it this amount. Conversely, users can associate an amount proposed for their purchase, the acceptance of which by the owner also triggers a transfer transaction, with priorities in a waiting list (or a voucher marking). Alternatively (or additionally), a mechanism can be implemented according to which regular micropayments of reserve units are made by users having a priority on the waiting list, failing which the priority may decrease in favor of other users (according to the amounts of their own micropayments). Users can thus adjust their micropayments according to the priority they want: lower micropayments make it possible to delay the conversion to a voucher token (let the priority decrease); higher micropayments allow it to move forward (try to increase priority). The tokennode manages the waiting list and, when converting to a voucher token, redistributes the units received by the micropayments equitably, that is to say by fully reimbursing the users who made the micropayments as planned and without their conversion being delayed, and by managing the priorities of the other users on the waiting list based on their respective adjustments, the users who adjust their micropayments to allow the conversion to a voucher token to be delayed being compensated if necessary by the surplus of micropayments received to advance the conversion to a voucher token.

It should be noted that said threshold values can be linked to separate dates (with given granularities, for example time slots) with which respective waiting lists are associated.

Examples of Applications

A producer of goods, here a baker, manufactures N baguettes daily. Thanks to this production, he can mark N tokens (here a "bakery" token, with a conversion value of 1 token unit for a baguette), each user thus being able to convert a "bakery" token that he owns into a "bakery" Voucher token allowing him to reserve a baguette on a given date. We understand that owing to this embodiment, a Bancor-type model is enriched in order to be able to use the tokens generated in this model for the most diverse uses, with a flexibility making it possible to control demand (periods of use of Voucher tokens, discounts linked to the date of supply, etc.), in particular depending on production and prospects.

The management and visibility of the waiting lists has a self-regulating effect which prevents a producer from generating excessive convertibility compared to his actual production.

In the second example which follows, we will illustrate that token vouchers are indeed linked to the assets they represent. The following example shows that a loss in value of the underlying asset is directly reflected in the value of the token.

Let us take as an example the case where the provider is capable of supplying fixed quantities of a product constituting a reference good (such as metal gold). Thus, a provider of metal gold which provides a convertibility of a certain type of token into gold vouchers, each representing 1 kg of metal gold. For example, he provides a convertibility with a ratio of 1 to 1 toward 1000 vouchers by blocking 800 kg of gold (blocking rate 80% because he estimates that his customers will never want delivery of more than 80% of vouchers they own, since he is trusted and his voucher tokens weigh less than metal gold).

Suppose that 1000 tokens have been converted to become 1000 "gold voucher tokens" (GVT), as described above.

A serious incident occurs: half of his blocked stock is stolen (400 kg of gold disappears).

In this case, one approach consists of adjusting the exercise value of the voucher, the holder of the GVT then only being entitled to 500 g of gold. The loss in value of the blocked asset (here in quantity) is therefore propagated to all of the vouchers.

In the case where only a fraction of the tokens has been converted, it is possible to adjust the convertibility threshold, but without bringing it below the number of converted tokens.

In the intermediate case where the number of converted tokens is between the original threshold and the new theoretical threshold linked to the loss of assets, the threshold is reduced to the number of tokens converted, thus prohibiting any new conversion, while adjusting the exercise value of the voucher.

Automatic Variation of the Price of the Token According to its Underlying Asset

As we have just seen in the example above, when a token represents an underlying asset (cf. the examples of assets given in the preamble), the value of this underlying asset may vary. The process which will now be described aims for the token node of this token to take account of this variation automatically or semi-automatically and to vary the price of the token accordingly by interaction with the nodes which hold it.

Example 1—Automatic Consideration

One unit of a "Gold" token represents 100 g of metal gold contained in a secure box, for example as described above, equipped with an electronic circuit (such as a wallet node device) capable of reporting a theft by violation of the envelope or movement detection using the GPS module.

Example 2—Semi-Automatic Consideration

A unit of an Equity token represents shares of a company. The value of these shares (and its variations) derives from digital signatures (certificates) by its auditor (for example), each notification of such a certificate triggering the taking into account of value variations of the shares automatically.

Said taking into account (on receipt of said notification, verified by a smart contract) consists of having units of the token in question automatically sold by the nodes which hold them, when the variation consists in a decrease in value—conversely, in automatically buying when the variation consists of an increase in value—so as to bring the unit of the token in question to its fair value (i.e. to bring its price, expressed in units of its reserve(s), to its fair value).

This sale—resp. this purchase—(as well as the resulting price variation) is immediate insofar as it is made without the need for compensation using the "RBT method" (for example Bancor). Advantageously, in another embodiment, it can be carried out in the form of exchanges according to the embodiment of chapter 8 below.

Concretely, for the first example, when a certain quantity of the Gold asset disappears (following a theft), the price of the Gold token automatically drops by the same amount, owing to sales according to the "RBT method" (sub-units of the Gold token are delivered to the smart contract by their respective owner nodes), which cause the price of the Gold token to be brought to the exact value corresponding to the new underlying asset.

As for the second example, during an increase in the value of said shares of the company, notified by digital signature or by automatically and securely referring to an external source (see the previous filings by the same inventor mentioned elsewhere), the price of the Equity token increases correspondingly, owing to purchases according to the RBT method (new sub-units of the Equity token are generated by the smart contract), which cause the price of the Equity token (expressed in its reserve units) to be brought to the exact value corresponding to the new underlying asset.

These purchases (respectively these sales) in order to bring the price of the token back to its fair value are executed, by the nodes holding the token in question, in proportion to the units thereof that they hold. This is executed automatically except when the holder has opposed it in advance (by configuring his node in this sense; he may for example prefer a semi-automatic mode, which will then be implemented offline).

It is understood here that the more quickly each holder node reacts by performing these operations, the more these operations are carried out with an advantageous price for this node (by the very nature of a method such as Bancor). It should be noted here that the smart contract automatically executes these operations reliably (owing to the integrity of the smart contracts already mentioned) and that it was designed to execute these operations without buying or selling more than in proportion to the units that the nodes in question hold. Advantageously, an automatic drawing of lots by the smart contract at said token node can avoid favoring certain holder nodes to the detriment of others.

In the case of token purchases (on notification of an increase in the value of the underlying asset) by the token holding nodes, the latter carry out these purchases automatically as soon as (and insofar as) they hold reserve units allowing them these purchases. In a particular embodiment, the holder node performs a method consisting of acquiring the missing units automatically (cf. in particular the embodiment of chapter 8).

In the particular case of a decrease in value of the underlying asset of the Voucher tokens within the meaning of the embodiment of Chapter 2, it is provided in the smart contract that only tokens not yet marked Voucher are automatically sold as described above.

This embodiment thus makes it possible to pass on the value variation of the underlying asset that a token represents automatically to the price of that token.

Finally, it should be noted that the same approach is advantageously adopted to implement an automatic arbitrage method in relation to the variation in the price of a token (expressed in its reserve unit(s)) on external markets (token exchanges): when its price drops (resp. goes up) externally (which can be detected automatically by automatically and securely referring to an external source, as already mentioned), units are automatically sold (resp. purchased) from token holders, in proportion to their assets, in order to automatically balance its price.

Assets Playing the Role of Tokens

Advantageously, the blocking of the assets, when it is a question of tangible goods, can be carried out thanks to means for detecting the presence or integrity of the goods, these means cooperating with a smart contract for generating/updating the convertibility threshold. These may include locks, electronic seals, machine-readable codes, for example within the meaning of the "Sensor Actuator Modules" described by the applicant in application PCT/IB2017/057707, the content of which is incorporated by reference, or even a combination of the integrity of an envelope as described in U.S. patent application No. 62/586,190 in the name of the applicant, the content of which is incorporated here by reference, possibly in combination with a detection of the integrity of a geographical position by GPS. Other approaches such as asset presence detection by weighing, security of the type described in https://www.crowdsupply.com/design-shift/orwl, etc., possibly combined with GPS detection can be implemented.

If GPS is used, provision is made for a reinitialization of the position in secure conditions each time hands are changed.

Not only tokens (whether convertible tokens, waiting lists or voucher tokens) can be transferred from one node (user)

to another, but also (of course) assets (which these tokens represent) can be transferred from one node (provider) to another.

When changing providers for the same assets, the tokens which correspond to them are automatically converted into tokens issued by the tokennode of the new provider.

To continue with the example of the stock of 800 kg of gold having led to 1000 GVT (see above), if 200 kg (i.e. half of the stock remaining after the incident), i.e. a quarter of the original stock, has been transferred to another provider whose tokens are GVT1, a quarter of the voucher tokens, a quarter of the tokens on the waiting list and a quarter of all of the other tokens in circulation are automatically converted into GVT1.

The change of provider is triggered by a process which is corroborated by the aforementioned means of detecting the presence or integrity of the goods.

Advantageously, the assets here play the role of an "indivisible" token transferred from one provider to another and managed in smart contracts. For example, a 100 g metal gold ingot in a small self-sealed box can be exchanged as a token, in the same way that metal gold acted as money in the distant past (the voucher tokens described above ensuring exchangeability and divisibility in any desired fraction). Such an asset "100 g of metal gold" is a safer token because when one acquires it, in the sense that one has the asset itself rather than a promise of its supply. We thus rehabilitate the original function of a currency constituted by a good which determines its value. This is valid both for a precious metal and for other types of assets.

Escrow Account

In a variant embodiment, the system is such that the second portion of the reserve account units (that which is not put in the reserve) is transferred at least in part to an escrow account. This escrow account is advantageously managed within the considered token node.

The smart contract includes rules for managing reserve units placed in escrow.

For example, the second portion of the received reserve units is by default in a "returnable" mode, but can switch to a "non-returnable" mode at the time of an effective reservation of a product (typically a Wallet Message" indicating a firm order of the product, when the initial obtaining of units of the token in question was only an intention), for example for delivery immediately or at a later date determined according to the delivery date provided during the reservation (for example 3 days before the planned delivery date, because the provider would have to incur costs from this moment)—where the concept of date can be of variable granularity as mentioned later in this description during the discussion of Time Ranges.

It should be noted here that only the returnable mode presents a risk of fraud—fraud in the sense that the provider does not return the second portion when the token is returned—but offers the essential advantage of offering convertibility with other tokens.

The smart contract therefore advantageously provides that the second portion goes to an escrow account at least until the time of the reservation (and only then will be transferred to the provider when there can no longer be any question that of him returning them), which will result in mitigating any risk of fraud (essential advantage/conventional vouchers, which do not require an issue request with transfer of reserve tokens at current prices from a user node and can be issued endlessly by the provider himself). Note, however, that said fraud can also be mitigated by associating reputation information with the token.

In summary, here we have the following possible events:
(1) receiving token units advantageously with placing reserve units (forming the second portion) in an escrow account (here the mode is returnable),
(2) (optional) returning of token units (i.e. sale of token units, i.e. conversion into reserve token units within the meaning of Bancor),
(3) reservation of product(s), involving the transition to non-returnable mode and transfer to the provider of the corresponding second portion, immediately or on a date determined according to the smart contract,
(4) delivery and burning of token units and transfer of the first portion to the provider.

Note that in the case of a right supplied implicitly and not entailing any subsequent supply, steps (3) and (4) are absent, but there can be a return (step (2)).

In the latter case, in general, the units forming the second portion are directly transferred to the provider, who is required to return them in case of an event causing step (2) and stakes his reputation. Advantageously, the units forming the second portion can also be kept in an escrow account for a limited period and transferred to the provider afterwards (if not returned in the meantime).

To summarize, we have described so far that a limited number of tokens (generated by a tokennode) are marked "Voucher" (and correspond to assets blocked or to be blocked in the future for these Voucher tokens), unmarked tokens may be on a "marking waiting list"; each such marking directly entailing the transfer of (at most) an amount $(1-RR)*n$ of reserve units to the provider(s) (n being the number of marked Voucher units divided by their price P expressed in reserve units), which restore(s) it in the event of deconversion; the supply or supplies correspond to a Voucher token being made at the request of the node which owns it (or as planned upon conversion to a Voucher token), the voucher token being then burned (deleted) by the token node and the balance (at least $RR*n$) then being transferred to the provider (against this supply).

Thus, the system of this embodiment constitutes an alternative to the Bancor model, while retaining the advantages thereof but also making it possible to associate, with tokens of this model, vouchers representing assets in limited quantity (which Bancor does not allow), the purchase/sale of tokens not causing any change in the value of the tokens in terms of reserve units used once vouchers are associated with it (or only up to the IH factor, as we will see below).

Chapter 3—Time Factors

This embodiment includes the following features:
means are provided for automatically causing token units to be received at a given token node in response to a reported change in the asset underlying this token unit, so as to adjust the value of the token unit on the value of the underlying asset that has varied.
Optionally:
this variation is signaled by detection of a variation in the quantity of a physical asset constituting the underlying asset.
secure means are provided (such as sensor means managed by a smart contract) to detect this variation.
this change is indicated by detection of the value variation of an intangible asset constituting the underlying asset.
secure communication means are provided, managed by a smart contract, with a data source capable of providing the value of the intangible asset.

In more detail, when purchasing a token, the buyer (user node) can communicate, to the provider (provider node), an initial set of one or more Time Ranges in which the buyer will request to be supplied (immediately or in the future). This set can be changed later.

Advantageously, the Time Ranges communicated to the provider can be fixed or depend on rules and in particular on a resolution of constraints, and for example be gradually restricted by adding additional constraints (depending on the application).

In response, the provider communicates a set of Dates to the buyer, located in the communicated set of Time Ranges, for which its supply capacity (typically a production capacity) has not yet been reached and the product will therefore be available (in the current state of the Time Ranges communicated to the provider).

Here, a Date (or potential supply date) refers to a date on which the provider believes he can or cannot supply. However, instead of periodic dates, we consider here dates with a given granularity data or time slots—for example hour slots or quarter-hour slots. A Date is thus a time interval for which the provider node reserves a certain supply capacity (which is normally limited) and according to which he will indicate to the user whether he can supply the latter or not in this interval.

The provider node calculates the consumption (owing to the Time Ranges linked to the purchases of the units of its token) of its supply capacity on each Date as follows:

The amount of each purchase by a user is divided by the total duration (expressed in time units in the granularity set by the provider) of the Time Ranges that this user communicated for this purchase, and the result of this division is spread out along of these Time Ranges by associating it with each Date included in these Time Ranges.

By accumulating these results for all users on each Date, the provider node determines the probable consumption of its supply on this Date.

These operations are performed incrementally during the creation and updates of Time Ranges linked to a purchase of token units and, for each Date included in these Time Ranges, if the supply capacity is already reached, this purchase is put on the waiting list (see above), and if not, the Date in question is made available for this purchase.

The reserve units received during token purchases by a user are broken down, proportionally, into a first portion corresponding to the available Dates and a second portion corresponding to the Dates on the waiting list for this user. For the first, $(1-RR)*n$ reserve units are transferred to the provider node and only $RR*n$ units are put in the reserve for the token, while for the second, all of the received reserve units go to the reserve (second portion equal to zero). (Within the meaning of what was previously described in chapter 2, the first portion includes the units marked voucher and the second portion includes the units placed on the waiting list.)

The user can then modify his Time Ranges to better match them with the Available Dates. The capacities on the different Dates are then recalculated and the allocations of the reserve units are reallocated accordingly.

Advantageously, the user nodes that are close with respect to the same provider node (see below, the tribe scores of chapter 9) mutually exchange the available dates that have been communicated to them by the latter. They also exchange information on the execution of supplies, as well as any outages of supplies, on the Dates in question. These notifications allow them to check the reliability of a provider and automatically penalize him in the event of a failure.

Chapter 4—Introduction of the IH Factor

In the above, the quantity of reserve units transferred to the provider node is $(1-RR)*n$.

An embodiment is introduced here where the first portion of the reserve account units is constituted by a first sub-portion whose the number is such that they would neutralize the variations in value of the token units when they are obtained and returned and a second sub-portion, the number of which is such that they generate a controlled value variation of the token unit, with an increase during reception and a reduction during return, with the following options:

the number of reserve account units in the second sub-portion is determined according to a variable parameter IH associated with the token and managed by its token node.

the parameter IH is a function of time data relating to the demand for supplies and the supply of supplies at the provider node.

the parameter IH is a function of a density and/or a distribution of possible supply instants in one or more time intervals where the supply is requested.

the parameter IH is a function of population data from different user nodes that have obtained associated token units, where these population data can be weighted by consistency data, between these nodes, with respect to token units of other types that they have obtained (compliance).

the parameter IH is a function of reliability data for the supply of products corresponding to the considered token.

the parameter IH is a function of at least two of these data.

a token node is adapted, in the event of variation of the parameter IH, to redistribute the allocation of reserve account units to its first portion and its second portion by transfer from outside the reserve to the reserve or vice versa.

In more detail, in this embodiment, a parameter or IH factor that is defined in more detail and whose implementation is described below, increases the portion kept in the reserve during the voucher token markings, the term $RR*n$ being replaced by $(RR+IH)*n$ and the term $(1-RR)*n$ being replaced by $(1-RR-IH)*n$, the IH factor making it possible in a way to reproduce the role of "the invisible hand of the market" when marking. We understand that with this factor, when marking token units in voucher tokens up to n reserve units, the voucher provider only withdraws $(1-RR-IH)*n$ reserve units (instead of $(1-RR)*n$), and this has the effect that the increase in the price of the token which took place during its purchase is kept at the limited level of IH. Then, when the voucher is redeemed ("Exert" transition), this limited increase effect is canceled (unless there is a change in the value of the IH factor in the meantime, in which case the increase is not exactly canceled): the complement $(RR+IH)*n$ remaining in reserve is transferred to the provider-node and the corresponding token units are deleted (burned)—thus, the price of the token more or less regains its value. And, of course, when voucher tokens (up to n reserve units, i.e. the number of voucher token units returned divided by the current price P of the token) are returned to the smart contract (executed on the tokennode) by the user, $(1-RR-IH)*n$ reserve units are at least partially (except for a "service fee," or according to other rules) reimbursed to the user (unless they automatically go through a "Back Conversion" deconversion transition beforehand, as specified above, to put the (1−RR−IH)*n units back into the reserve before the tokens are returned).

We understand that increasing the IH
is supposed to make the token more volatile (since a larger portion of the received reserve account units goes into reserve, noted "(RR+IH)*p") and
reduces its "pre-financing" portion (denoted "(1−RR−IH)*p").

The idea here is that the more volatility there is (IH increases), the less pre-financing there is, which encourages the token issuer to have a safer underlying asset (by increasing its production capacity, the quality of the product, etc.) to make his token less speculative and lower the value of IH (to return to greater pre-financing).

But IH is not the only factor that determines the volatility of the token. Initially, in a Bancor-type system, it is the reserve rate RR that determines the volatility of the token: the larger the RR, the less volatile the token. With IH, this role is played by RR+IH (IH varying between zero and 1−RR).

In the case where IH is zero, there is no volatility at all regardless of the value of RR. The IH factor in fact makes it possible to control the impact of the reserve rate on volatility: the larger IH is, the more RR determines the volatility of the token, and the smaller IH is, the less RR determines the volatility of the token.

EXAMPLE

In a Bancor-type architecture, there can be no limit to the number of "Baguette" tokens that the bakers provider node sells, because they are generated automatically (by the smart contract that runs on the bakers node) each time someone want to buy it—otherwise, there would be no way of always being capable of arbitrating with external markets.

But because of this non-limitation, it may be that there are too many tokens generated compared to the bakers production capacity (suppose that he becomes a rising star and buyers speculate on the value of his token).

The goal of the IH factor is to capture this aspect of speculation: if there are probably more tokens generated than baguettes that the baker can provide (and we propose a method to calculate it below), then the IH is all the higher, which allows the price of this token to go up at the IH speed, but also to go back down just as quickly if people get rid of it (i.e. if they sell the Baguette token), which happens for example if his peer reinsurers let him go—his reinsurers are typically neighboring bakers who supply in his place when he cannot do so (as described below). Typically, its reinsurers will replace him when his oven breaks down or when he has health problems preventing him from producing normally, but any kind of reinsurance is possible, for example providing baguettes in his place if there is too much demand. An smart reinsurance contract then automatically exchanges the Baguette token in question with a Baguette token from another baker, via one or more reserve tokens.

As we will see later, thanks to the IH factor, tokens cover all cases, and in particular this model makes it possible to achieve a unification between classic trade and insurance:

Take for example boiler maintenance tokens (with repair service and 24/7 assistance), such a contract can indeed be seen as an insurance contract (insurance of the fact that the boiler will always continue to operate or, where applicable, with limited downtime).

The provider of the boiler maintenance service will typically associate a price P with his token corresponding to the annual basic maintenance of a simple and basic boiler in very good condition, rarely requiring repair or assistance.

Nothing will then prevent him from selling 1.2 units of this token per year to the owner of a boiler X which, according to him, risks costing him a little more work (or for a larger house to heat); 5 units per year for a very old boiler Y, etc.

This is how the transaction amount (corresponding to the insurance premium) can be calculated (or negotiated) on a case-by-case basis, depending on the risk presented by the buyer. (Note that the risk presented by the buyer is not taken into account in the IH. The IH is rather a function of criteria such as the size and therefore the availability of its team taking into account the volume of its clientele, its skills and its ability to repair breakdowns, its speed of intervention (which is mainly a function of the distance), etc.)

This does not prevent, in order for the market to remain socially fair, the application of constraints to this negotiation (fixed or framed public rate), these constraints being managed by the smart contract.

Taking the IH factor into account leads us to a broadening of the concept of voucher tokens, allowing these to be used for insurance applications like in the example above. This is what we will now describe:

We have already seen for voucher tokens that, when purchasing units of a token T that are not marked Voucher (simple "Token"), all of the units (of the reserve token of T) received for this purchase go in the reserve of T.

Conversely, for a token T marked Voucher ("Voucher Token"), it is a predetermined fraction RR*p (p here being the number of reserve units received for this purchase at price P) that is assigned to the reserve, the rest being allocated to the provider, taking the place of pre-financing or deposit (or blocked to form "blocked assets" as described below).

It may be desirable for the concept of Voucher to be gradual, with a variable IH factor ensuring the progressiveness between a non-Voucher token and a Voucher token.

Thus all of the tokens here are, in a way, "more or less" Vouchers and it is the IH factor (for "Invisible Hand") which makes it possible to indicate the extent to which they are, that is to say are similar to the Voucher tokens described above—the case IH=1−RR representing the extreme case of tokens which are not Vouchers at all.

To illustrate this principle, if:
p is the number of reserve units received,
RR is the reserve ratio, and
IH is the aforementioned factor,
we assign (RR+IH)*p units to the reserve, and (1−RR−IH)*p constitutes the deposit paid to the provider.

We will now generalize the tokens by keeping the formulas $$reserve = (RR+IH)*p \text{ and}$$

$$pre\text{-}financing = (1-RR-IH)*p$$

for all the tokens.

There is therefore no longer any distinction between Token and Voucher token, and the case IH=1−RR is a special case where the product supply commitment is not associated with the token (case of classic Bancor tokens) and therefore where all of the received reserve token units go to the reserve.

In the following, the term "Token" will denote both classic Bancor tokens and Voucher Tokens with progressiveness defined above.

The vocabulary used was already defined earlier in the introduction. Let us remember that:

The purchase of a product from a provider is seen here as:
1. Receiving a corresponding number of token units associated with this provider (i.e. their purchase by a usernode, called "user" or "customer"),
2. the product in question possibly being (immediately or subsequently) supplied in exchange for these purchased token units.

The tokens then act as "vouchers" purchased to obtain the supply in question. Obviously, in return for the benefit of "pre-financing" that he derives from it, the provider can offer incentives, such as discounts, bonuses, etc. in particular according to the time which has passed or which must pass before the voucher in question is redeemed.

The purchase of units of a token T here refers to the conversion, into units of this token T, of reserve units of this token T (according to a given RBT method, such as Bancor).

The provider for a given token T is a providernode associated with the tokennode that issued said given token T (and to facilitate reading, we consider here that there is only one, but this is not limiting). "Buyer of a token T" refers to the node purchasing a certain quantity of units of the token T in question, allowing it to obtain a certain number of units of a product from the corresponding provider.

The transfer of the portion $(1-RR-IH)*p$ to the provider can be seen as advance payment, the supplement $(RR+IH)*p$ being paid during the supply (or the portion $(1-RR-IH)*p$ can be reimbursed (in full if the value of IH has not changed) if there is no supply, depending on the smart contract (like for the embodiment of chapter 2).

It is considered for the present explanation that the supply is done according to rules specified in the smart contract, such as "by reservation," "based on a waiting list," "by drawing by lots," etc. or "on triggering event" as we will see below. These rules may require more or less commitment on the part of the provider and, as already explained, the value of IH is representative of this commitment: the IH factor is all the higher as the providernode does not commit to the future stocks, and/or the planned supply is distant in time or uncertain at the time of purchase of the token. The IH factor can thus depend on a certain number of parameters such as production capacity and rate, risk factors, possible token redemption period, etc.

More generally, the value of the IH factor and its variations over time may be determined by any method, in particular for the purpose of regulating the price of the token depending on the environment or circumstances (see in particular the example of chapter 11 where the IH factor depends on traffic). Artificial intelligence algorithms may be part of such methods.

Chapter 5—Times Ranges and IH Factor

We will now describe an embodiment based on possible Time Ranges and Dates of supplies in combination with the exploitation of the IH factor (see chapters 3 and 4 above).

As described in chapter 3, when purchasing token units, the buyer (user node) communicates an initial set of Time Ranges to the provider (provider node) and the provider then communicates a set of possible supply Dates, located in these Time Ranges, to the buyer. But here, the provider node determines its IH factor from its remaining supply capacities on these Dates (remember, owing to the integrity/authenticity properties of smart contracts).

The initial value of the IH factor is determined (then revised incrementally) upon purchases of token units by user nodes according to the coverage of the Time Ranges by the Dates communicated to them as well as the available capacities remaining on these Dates.

In one embodiment, the value of IH is determined according to the density and the distribution of the remaining available capacities in the Time Ranges—the better the Dates in the future cover (in terms of density and distribution) the Time Ranges specified by the users, the lower the value of IH.

The density is for example determined by subtracting, from the capacity available on the different Dates, the expected consumption by users, that is to say the units they have purchased divided by the durations of the Time Ranges they indicated during their purchases.

The distribution is for example determined by dichotomous breakdowns, with increasingly fine granularities so as to form a tree. At each breakdown level, the distribution level (i.e. a value representative of the regularity of the distribution in the time window constituted by the concatenation of Time Ranges) is calculated by taking into account the difference between the median remaining available capacity before breakdown and the remaining available capacity on each side after breakdown. The course of the tree by cumulating the values at the different breakdown levels makes it possible to obtain the level of distribution at the finest level (so-called Lea algorithm).

The IH factor as well as the Dates communicated to the users are revised incrementally due to the fact that user nodes modify their respective Time Ranges (typically by adapting to the Possible delivery dates and available capacities communicated by the provider node) or finalize their reservations on specific Dates.

Thus, the value of this factor fora certain purchase of token units is upwardly revised when the coverage of the communicated Dates corresponding to this purchase decreases, which causes a decrease in the financing portion: when the IH factor assumed for a purchase of units of a given token increases, the formulas reserve=$(RR+IH)*p$ and pre-financing=$(1-RR-IH)*p$ are recalculated and the provider transfers the missing reserve units as a result to the tokennode, which adds them to the reserve of this token. Consequently, the provider has an interest in keeping his supply capacities as high as possible in order to keep a value of IH that is as low as possible and to benefit from greater pre-financing, for as long as possible.

Advantageously, as described in chapter 3, nodes obtaining units of the same token communicate the Dates to each other which have been communicated to them by the latter, which allows them to check the consistency of this data (advantageously, these are the user nodes that are close with respect to the same provider node—see below the tribe scores in chapter 9). They also communicate information to each other on the redemption of supplies, as well as any outages of supplies, on the reserved Dates. For example, a failure to supply may result in a penalty in the form of an increased IH value for this defaulting provider.

Another approach to determining the IH factor is to give a lower IH value to more trusted issuers. The quality of "trusted issuer" is determined by counting the number of nodes that purchase the considered token. To avoid a "Sybil attack," these buyer nodes are weighted by compliance data taking into account the types of tokens that the other nodes that buy this token also buy—the more compliant they are, the more credible they are. Thanks to this weighting, a "Sybil attack" would actually favor the nodes that it is trying to penalize. These other nodes can be those with a high tribe score (i.e. a close token purchasing profile, as described in chapter 9). The integrity of these weighted counts is guaranteed in the smart contracts.

Alternatively, simply balancing these counts with the number of reserve account units paid for the purchases in question suffices (a Sybil attack in order to benefit from pre-financing will not be worthwhile if it involves blocking too many reserve units, as this would neutralize the goal). These two weighting approaches can also be combined.

Furthermore, there may be many buyers of a considered token, not with a view to obtaining a product associated with the token, but to speculate on the value of the token. In this case, the fact that (according to this method) the IH decreases will dissuade them (because the more the IH decreases, the less the price P of the token fluctuates), but if we want to take account of the fact that these purchases are speculative and increase the IH rather than lowering it, advantageously we will combine this method with the previous ones (giving them priority in this case).

According to yet another approach, the IH value is based on information indicating whether the neighboring nodes of a given token node obtain the product or not when they present the token (or in a more elaborate variant, whether or not they have been delivered on time in relation to their previous reservations). The neighboring nodes here are those which have a close token purchasing profile (high tribe score). Thus, if its neighbors have regularly obtained the product corresponding to the token thus far, then most likely the provider does not make empty promises, he is reliable and his IH deserves to be low (and he is thus entitled to strong pre-financing), and vice versa.

This approach can also be combined with the previous ones.

Chapter 6—Network Insurance and IH Factor

We will now describe the specific case of a "supply upon triggering event" (such as the occurrence of an accident). In this embodiment, the token units for a given token node can be converted into supplies of products or reserve units previously blocked in blocked assets, and further comprising means for determining a number of token units to be received in order to be supplied with a given quantity of products or reserve units previously blocked based on probability data for events triggering such a supply, at least a portion of the reserve account units which have made it possible to obtain the token units being transferred to the provider node of the products and/or to the blocked assets.

It may involve the supply of products like above, or the supply of reserve units. In the latter case, said units (1−RR−IH)*p then constitute "blocked assets" for this purpose.

The type and conditions for validation of triggering events are defined and implemented in the smart contract.

Note that in the case of supplies upon triggering events, in general the tokens in total represent more assets than the actual assets (since "all accidents do not happen on the same day").

For example, out of a population that will buy tokens allowing them to obtain a certain medicine (let us posit that the price of a box of medicine here is one token unit), only a portion of this population will fall ill and effectively convert these tokens in a box of medicine.

The volume of medicine to be supplied is therefore less than the number of tokens purchased. As a result, these tokens must be obtainable at a lower price without disturbing the economy of this market.

To illustrate this point, if for example one person in a population of 1000 becomes ill and needs a box of medicine, it suffices for each person to buy for 0.1% of the price in tokens of the box of medicine in order for the availability of the box of medicine to be guaranteed. In the end, the price to be paid (in tokens) by each person is equal to 0.1% of the price of the box of medicine (here ignoring brokerage fees of the "service fee" type or others).

This makes it possible to unify "classic" trade and insurance.

Advantageously, when all of the assets are already consumed and new triggering events occur (and trigger supplies of assets to be made), the new supplies to be made form a "supply waiting list" and are executed later when new assets become available (for example in response to a "call for contributions") (see also the "Reinsurance" section below).

Typically, but without being limiting, a triggering event is a notification by a user node of an "claim" validated by a hardware device and/or upon digital signature by one or more trusted arbitrators/experts provided for in the smart contract, and the supply to be made typically represents the payment for damage caused by this claim; another example of a triggering event is winning a lottery; finally, a type of triggering event could even be the simple request by a user for the supply of the asset in question.

In all cases where this is possible, the triggering event is preferably detected by sensor means managed by a smart contract, or even via a communication channel with a reliable source of information (for example a digitally signed certificate from a doctor, the lottery information system, etc.), again with the intervention of a smart contract.

Of course, the smart contract can provide that the beneficiary user can confirm or cancel the triggering event.

Thus, a triggering event will be an event whose notification is validated by a smart contract.

To differentiate the tokens generating supplies upon triggering events of the tokens serving as product vouchers (or to distinguish them from the Voucher tokens of the embodiments described in chapters 2 and 3), they are also called "support tokens."

We will focus below on the case where a triggering event allows the release not of products, but of reserve units included in the blocked assets.

Figure 4C:
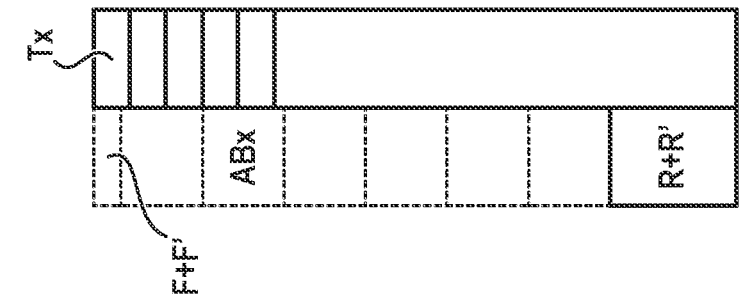
FIGS. 4A to 4C illustrate a particular implementation of a system with Voucher tokens in unlimited quantity and network insurance.
Figure 4B:
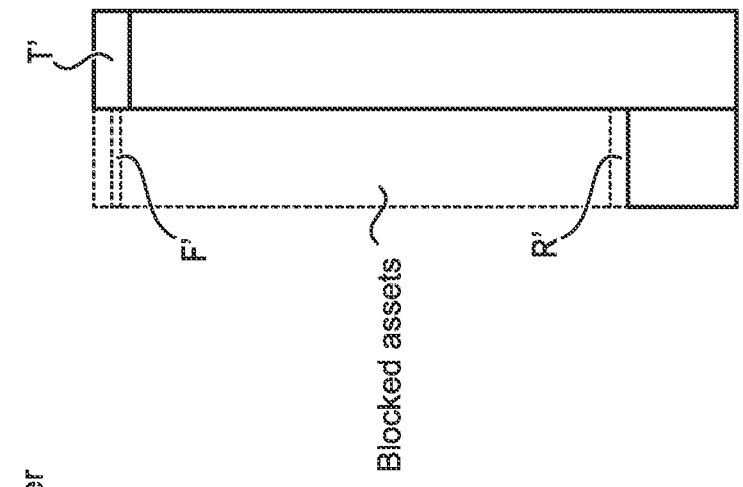
Figure 4A:
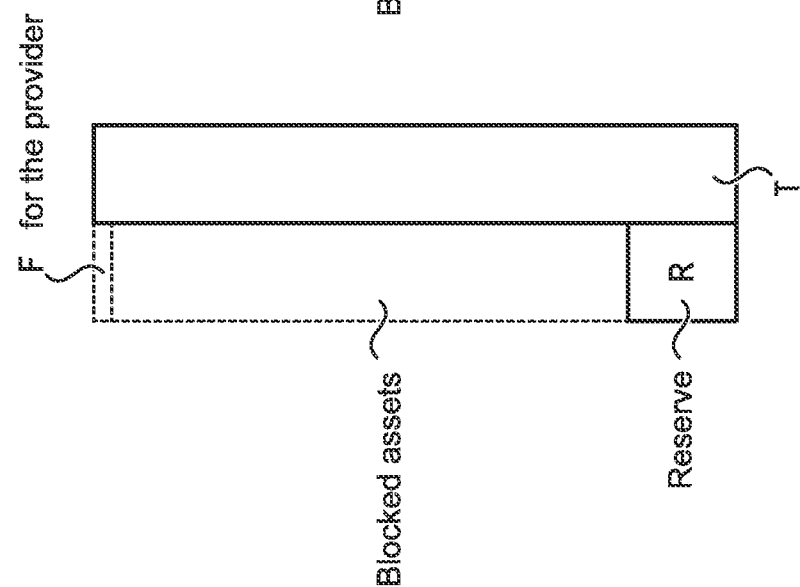

As illustrated in FIGS. 4A-4C, the blocked assets may include said (1−RR−IH)*p reserve token units—minus any portion potentially taken by the provider(s) for the service rendered —, the blocking being implemented ("enforced") automatically by the smart contract.

Upon each triggering event, a portion of the blocked assets and a portion of the reserve are automatically supplied by the smart contract to the recipient node(s) of the medium provided in the smart contract for the event in question. The portion of the blocked assets is based on an estimate of the triggering events likely to occur: as for the portion of the reserve, it is calculated so as to keep the price of the token stable (to the nearest IH factor). This is described on an example with reference to FIG. 4A, which shows the current situation of a support token "T" having an RR of 10% (10% of the reserve token units received are directly allocated to the reserve by the token node) and a price of 1 reserve token unit (1 unit of T=1 reserve token unit), where 99% of the 90% of the received reserve token units (1−RR=90%, IH is ignored here) are blocked by the smart contract in order to form said blocked assets, the remaining 1% of these 90% being taken here by the provider (F) for the service rendered.

In the Figure, 1000 token units T have already been purchased and 891 reserve token units have been blocked to form the blocked assets (1000*90%*99%=891).

FIG. 4B illustrates the case where x additional purchased tokens (7) are split into:
a portion R' to increase the reserve R,
a portion F' for the provider,
the rest being added to the blocked assets.

In this example, it is estimated that, upon triggering events, at most 10% of the tokens T purchased (here 100 tokens) will be returned (to receive the supply in question). This estimate (taken as a parameter) allows the smart contract to determine that each token unit Tx provides 8.91 units of blocked assets ABx upon triggering event (see FIG. 4C). Indeed, these 10% here represent 100 token units T and the number of 891 blocked reserve units as underlying assets therefore had to be divided by 100 in order to obtain what the smart contract will provide to the recipient node(s) for each token unit T presented upon a triggering event.

As for said (RR+IH)*p units of the reserve, each token unit T presented upon triggering event (which is then burned) involves transferring, to the recipient node(s) of the medium, RR+IH reserve units (if the current price is 1)—thus, in this example, 0.1 units are removed from the reserve—so as to keep the price stable (in a manner similar to the embodiments of the preceding chapters).

To illustrate this more concretely: suppose that the triggering events here are the breaking of a leg and that the reserve token units are ETH; then, at a given moment, each token unit T costs 1 ETH (Tx) and makes it possible to receive 8.91 ETH (ABx)+0.1 ETH=9.01 ETH when its holder breaks a leg.

The underlying assets may be hospital care units, ingots of 100 g of metal gold, bags of 50 kg of rice, etc., and insofar as these are "indivisible tokens" (or "solid tokens") managed by the smart contract as mentioned above, their blocking in underlying assets is also enforced by the automatically smart contract (as well as their unblocking upon triggering events, which can be determined as has been said either by sensors or by reliable sources of information, under the guidance of a smart contract).

Still in the medical field, the use of underlying assets of the care type can be triggered by physiological measurements carried out by sensors embedded in the human body and associated with a secure microdevice of the wallet node device type also embedded and powered by a battery, the smart contract advantageously being capable of collecting a validation or non-validation action by the user beforehand (preferably without this non-validation by the use being broadcast in the network).

Advantageously, the tokens also have a limited lifespan (an expiration date) and the token purchases must be renewed by the user when their expiration dates occur (similar to an insurance premium), to continuously benefit from assets in the event of a triggering event.

The lifespan of tokens (as well as their price) is determined so that the renewal of token purchases compensates for the supplies made at the recipient node(s) upon triggering events. Using the previous example, each token unit T provides 8.91+0.1 reserve token units upon triggering event if it is estimated (statistically) that 10% of tokens are returned upon triggering events per year and if the tokens T have a lifetime of one year (the period of one year has been taken here as an example). Thus, the lifespan of the tokens depends on the frequency and volume of triggering events (and of course the price of these tokens—note will be made here of the advantage of the possibility of purchasing token support for very short periods by micropayments).

When the tokens expire, the unconsumed assets generate new units (representing these unconsumed assets) for the holders of these tokens.

Advantageously, the amount of reserve token units (said 8.91+0.1 units) supplied upon triggering event and/or the lifetime of the tokens can be dynamically adjusted (continuously or periodically, or according to other rules) according to the quantity of tokens already presented upon triggering events so far (similarly to the account units of a life insurance account ("Mutual Funds")).

Chapter 7—Networked Insurance and Reinsurance

In this embodiment, the nodes form a system of provider/beneficiary nodes of "support commitments" of a certain type (that is to say of commitments to supply assets upon triggering event, in exchange for support tokens)—each beneficiary node can itself provide a support commitment of the same type to some other nodes, the latter to still some others, and so on, the nodes and support commitments of a given type forming a networked insurance P2P network.

Reinsurance: "Unity Makes Strength"

In a networked insurance context, the nodes providing support commitments (the token nodes generating support tokens) have an interest in "reinsuring" each other and thus better benefitting from the law of large numbers. A reinsurance commitment consists in the smart contract enforcing the provision (to the beneficiary node of the reinsurance commitment) of the asset (or portion of the asset) of the provider of the reinsurance commitment when the own asset of the node benefiting from the reinsurance commitment is exhausted.

For example, in the case where the underlying asset (or blocked asset) is a care provision, this mechanism makes it possible for a care provider unable to provide it (for example lack of care bed for hospital care) to be capable of replacing it by another care provider (a nearby hospital) to provide the care in question. Thus the following example illustrates the use of care units (tokens To1) versus support units (tokens To2), the former being used as a reserve for the latter, the excess needs for care units being satisfied through a smart reinsurance contract.

The care units To1 here are tokens marked Voucher Token according to an embodiment of one of chapters 2 to 4 and are dated.

Concretely, in this example:
the reserve ratio RR of the reserve in To1 for To2 is 10%.
on average per day, 10,000 users each buy 1 support unit To2, at the price of 1 To2 for 1 To1 dated (redeemable) that day. To2 tokens have a lifetime of one day.
the provider has 100 beds (the provider is the hospital that sells the token To1). The bed costs an average of 90.1 care units (To1), as emerges from the following calculation. The hospital has set the price of the unit of To1 accordingly (e.g. 0.3 ETH).

Based on an estimate that each day, 100 users each present 1 To2 upon triggering event, the smart contract sets out that each To2 makes it possible to benefit from 90.1 care units To1 upon triggering event (indeed, the "cake" of 10,000 units of To1, minus 10% of RR, is divided into 100 portions: 9000/100=90, and the reserve of 1000 units of To1 is divided into 10000—here ignoring the portion taken for the management of the insurance).

An excess, if applicable, relative to the number of available beds means that too many units To2 were presented on that day (the triggering events are in a quantity exceeding the estimates), causing the excess of the (care units (To1) constituting the) blocked assets.

When such an excess occurs, a smart reinsurance contract is automatically triggered to draw on the assets blocked for another support token (To4)—here care units (To3) from a nearby hospital (sought gradually, automatically, until one is found with an available bed—see the embodiment in chapter 10).

With respect to the law of large numbers, such smart reinsurance contracts potentially offer a P2P network (having a "networked insurance" topology as stated above) the power of centralized risk pooling (traditional insurance), with the additional ability to deal with financial players (insurers strictly speaking) and operational players (medical universe, repair technicians, etc.) at the same level.

Deployment of the Networked Insurance
With regard to the deployment of support commitments, the enforcement of smart support commitment contracts is advantageously triggered automatically by other smart contracts, which entail the purchase of support tokens, thus automatically starting the smart contract of the corresponding support commitment. For example:

When purchasing a product, the buyer (or seller) automatically acquires support token units from the seller (resp. from the buyer) for example for $\frac{1}{100}$th of the amount of the purchase (remember here that a support token is divisible).

The geographic proximity (or according to dimensions other than geographic) between two nodes, whatever they may be (or according to predefined conditions), periodically triggers a purchase/sale transaction of support token units. This makes it possible to receive support locally (for example, a car repair service in the event of a breakdown, etc.) rather than from a remote support provider. Advantageously, the user node automatically receives GPS coordinate information (for example when it is embedded in a smartphone), to automatically trigger the purchase of corresponding support tokens from commitment providers.

Chapter 8—the Network Effect

In this embodiment, the system further comprises means for transferring units from a given token (first token), in response to an increase in utility or use of a network of token nodes having this given token as a reserve unit, towards the reserve of token nodes contributing to this increase.

This provides a reward for a "network effect" depending on the participation of the nodes in the operation or development of the network. Advantageously, the increase in utility or use of the network is determined by at least one of the following factors:

an intention to purchase a good or service, materialized by the purchase of units of a specific token by reserving the given token,
an offer for sale of a good or service with a specific token than can be obtained by reserving the given token,
the actual purchase of the good or service,
the conversion of the specific token into a Voucher token (according to the previous chapters) for exchange with the good or service,
increasing the availability threshold for the specific token into Voucher token.

Different means can be used to implement a measurement of the network effect. The network effect here is in particular within the meaning of Metcalfe's law for example, which notes that the usefulness of a network lies in the number of its potential links; however, these increase according to a law in $n^2$. A network effect within the meaning of Reed's law, in $n^3$, which determines the potential number of communities that the network can form, is also relevant. The principle underlying this embodiment is to remunerate nodes of a network when they increase its usefulness.

Take the specific case of "indivisible tokens" representative of a gold or metal asset as mentioned above (let us call them "solid tokens"). The more solid token providers there are, the more the usefulness of the network increases, because not only is it possible to buy conventional (divisible) voucher tokens from such providers, but it is also possible to go and meet such a provider on site to buy solid tokens from him and increase the security of his assets.

Throughout the duration of the sale of a solid token (here a gold token), the seller is remunerated for it (he therefore has an interest in expanding the network by putting his solid tokens up for sale). Conversely, a user can declare his request for a solid token to the network and be paid for the duration of his request.

The same approach can be adopted for sales/service purchase applications. Throughout its duration, the sale (resp. purchase request) of a service is paid, since it benefits the network. Examples will be given of transport offers from "vehicle" nodes and transport requests from "passenger" nodes (advantageously, the positions/movements of these nodes being captured in a secure manner, for example as described in chapter 11—see also the applications mentioned in this same chapter).

This principle can be generalized by offering rewards to different types of actions generally increasing the activity of the network (services incidental to a basic service, new physical assets, etc.), if necessary with security by sensors connected to the network.

In a particular embodiment, for a given first token, the second tokens which have it in reserve form its network and the contributions to the network effect are:

purchase intentions (by user nodes) for products—which are subsequently actually purchased by these user nodes—products from provider nodes whose corresponding tokens (second tokens) have this first given token as a reserve, and
the sales by said provider nodes of said products that these user nodes have actually purchased.

The start date of the purchase intention is triggered by the purchase (by a user node) of units of a second token. Then, when these latter units are actually used for a purchase (of a product from a provider corresponding to the second token), this purchase causes a reward consisting of units of the first token (which thus allow the user node to purchase more second token units).

As for the reward of the token node of said second token, the product of which was actually purchased, it consists of transferring more units of the first token to this node. Advantageously, the start date of the sale is triggered by the provision of vouchers (which can be combined with tokens to convert them into a "Voucher token") according to an embodiment of chapter 2 or 3, and the duration of the sale ends when the voucher token is formed (i.e. when the token is marked as a voucher token).

These rewards advantageously make it possible to regulate the price of a token, and this is what we will now describe.

As already mentioned, for each token, an underlying asset is the utility of the network formed by this token. In this sense, with each purchase (upon each generation) of units of a second token up to one unit of the first token, a portion of the IH*p reserve units of the first token (which would cause its price increase—see the description above) is dedicated to the operation and development of this network, in particular to the redistribution to the nodes based on their contributions to the network effect as described above.

The token price is regulated by adjusting the size of this portion.

Furthermore, the volume of gains received by each node (user or provider) for its contributions (contribution to the operation/development of the network; contribution to the network effect) determines the extent to which this node participates in the governance of the network (to decide on these adjustments).

An application scenario of this method is the creation of a first token, called "cooperative," whose second tokens (which have it as a reserve) are generated by nodes (token nodes) belonging to the members of a given group, for example from a producer cooperative. Before the creation of a cooperative token, the members of the group decide together on the reward rate for the rewards that will be automatically allocated to them as actual providers contributing to the network effect of the cooperative token. Thus, they will set the size of the portion of the (1−RR−IH)*p reserve units of the first token that will be assigned to the operation and development of this network, and in particular they will set the size of the portion dedicated to the redistribution to the nodes of actual providers who are members of the group (based on their contributions to the network effect as described above) as well as to the nodes of their customers.

Chapter 9—Amortization of Token Value Fluctuations

According to this embodiment, the system further comprises means for transferring reserve account units between token nodes in a controlled manner so as to act on the values of the token units via their respective reserves by attenuating the fluctuations of said values caused by the token receiving and return transactions (reciprocity).

According to advantageous features:
the reserve account unit transfer means are capable of controlling the quantities of reserve units transferred according to scores established for each token.
the score for a given token is linked to the significance of the transactions performed on the token in question.
this significance of transactions on a given token is determined based on at least one of the following factors: the volume in account units of transactions of the given token, the number of user nodes triggering transactions of token units, the age of the transactions of the given token, the value variations of the token that would be obtained by applying a gross reserve rule where all reserve account units go into the reserve (in particular Bancor formula).
the scores are determined by iterations on increasingly large sets of token nodes and user nodes based on links between such nodes, where these links can be formed by the transactions.
a transfer from reserve to token node is carried out only if the score of the latter is above a threshold.
the quantity of reserve units transferred to a token node is determined according to the score of the latter, this score for example being higher when the transactions of the given token are recent.

Advantageously, this system is implemented in a decentralized peer-to-peer manner by processing integrated into the token nodes.

It is recalled that one aim of the invention is to allow a user to use a token issued as a "voucher" by a given producer in order to buy a product not only from this producer, but even from another producer, the conversion from one token to another being done transparently. And that, as already mentioned in the preamble, in the RBT method, simply converting one token into another (via their reserves) inherently causes a variation in their values.

In this embodiment, in order to lessen or even neutralize the variations in the value of the tokens during certain exchanges, a token node (or several token nodes) managing a second token that automatically "lend(s)" reserve units to token nodes managing a first token, which they must return to them later—they will in particular do so when they in turn play the role of second token node.

In this system, these loans tend to compensate each other by design—this allows smart contracts to at least compensate for loan balances on both sides less frequently. For this purpose, in each token node an algorithm is executed for calculating "potential reciprocity scores" of tokens with respect to the node that executes the algorithm, it being noted that a token to which no score is assigned implicitly has a zero score.

The algorithm is such that the tokens with a high potential reciprocity score are first of all those which in the short term are more sold/bought by a large number of same users, and the algorithm expands this set of high scoring tokens iteratively by applying this same criterion to tokens that already have a high score until the scores become negligible, as we will see below. These scores are updated incrementally during the purchases/sales of these tokens by their respective users (or according to given rules).

In one particular embodiment, based on these potential reciprocity scores, each token node of a second token lends, following the purchase of its token (by user nodes) and therefore during the resulting increase in its value (according to the "RBT method," for example according to the Bancor formula), reserve units to the token nodes of first tokens that have high potential reciprocity scores and whose values have decreased (during token exchanges, as already described). It thus causes a drop in the value of its token against the increase in the value of the tokens of the nodes to which it has lent the reserve units.

A loan of reserve units can be provided selectively by verifying that the score exceeds a threshold, and possibly adjusting the number of reserve units loaned based on the value of the score.

In all cases, the number of units loaned is limited by the formula (1-RR)*n (n being the number of reserve units received during said purchase—as described above).

In relation to FIG. 3, in one particular embodiment, the algorithm for calculating potential reciprocity scores executed on the token node of a given token (T0):
obtains, from all of its user nodes (U0), information from the set (T1) of tokens that these users buy/sell (T1 including T0),
then obtains, from the nodes of the set T1, the information of the union of the sets of their own users (U1, including U0),
then obtains, from the nodes of the set U1, the information of the set (T2) of the tokens that these users buy/sell, then forms, from the information obtained from the nodes of the set T2, the union of the sets of their own users (U2), . . .

and so on.

For clarity, only the sets T0, U0, T1 and U1 are shown in FIG. 3.

As already said, the algorithm aims to assign potential reciprocity scores to the elements of said sets of tokens (Ti). The algorithm also aims to assign "tribe scores" to the user nodes (Ui), the nodes to which a score has not been assigned implicitly have a zero score.

At the start, a score of 1 is assigned to the starting token T0 (and all of the other tokens implicitly have a zero score). Note that as a variant, the starting point may not be a single token, but a set of starting tokens, in which case each token in this set has an initial score of 1 divided by the number of elements of the set.

The tribe scores of each user node in each set (U0, U1, etc.) are (re)calculated by adding the potential reciprocity scores of the tokens they have used (i.e. from which they have purchased or sold units) of the corresponding set (T0, T1, etc.), and normalizing them, i.e. dividing each score by the sum of the scores so that their total is equal to 1.

Figure 3A:
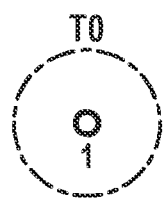
FIG. 3 shows sets of nodes determined, by a score calculation algorithm, from relationships between, on the one hand, user nodes buying/selling tokens and, on the other hand, the token nodes corresponding to the purchases/sales in question, desire to amortize by the neighborhood in the network, the value fluctuations of tokens.
Figure 3B:
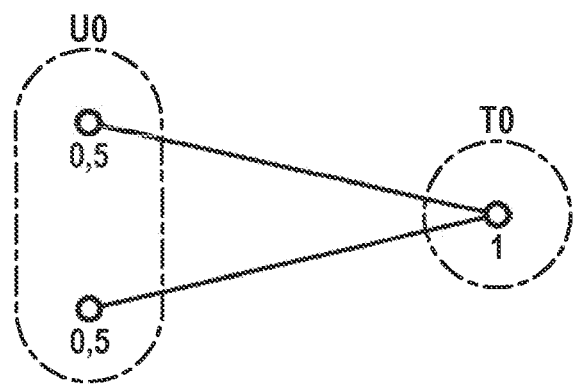
Figure 3C:
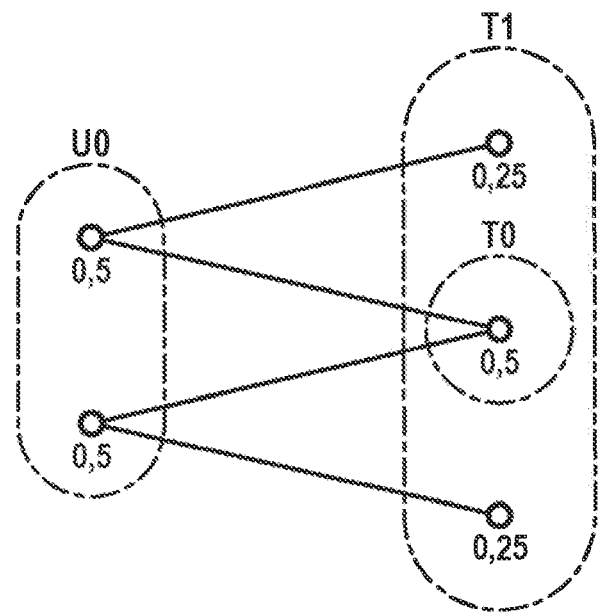
Figure 3D:
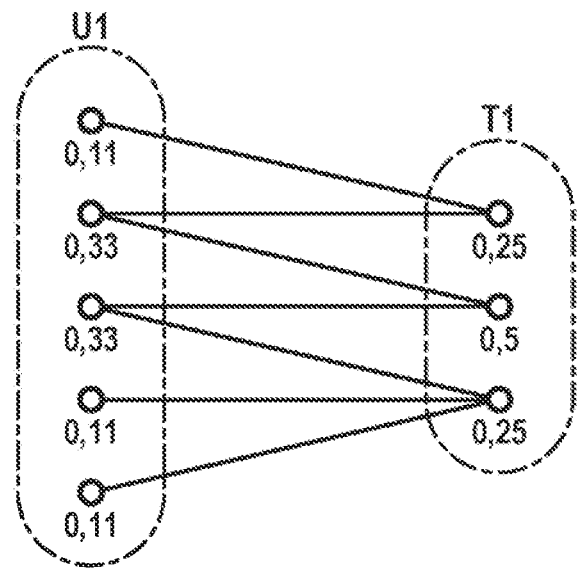
Figure 3E:
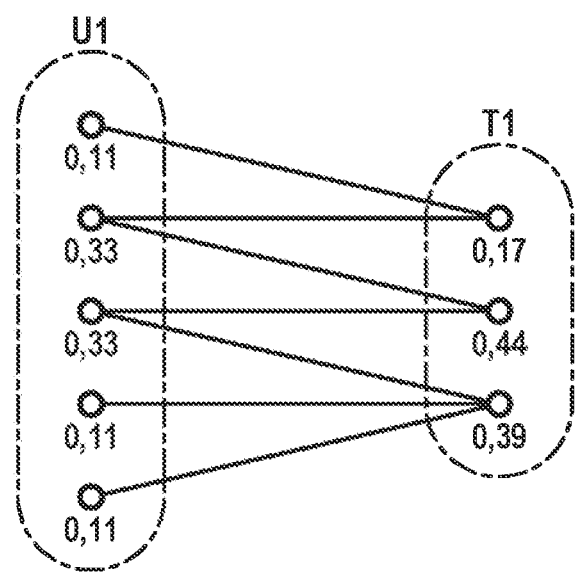

Thus, in the example in FIG. 3:

The two nodes of U0 initially have a score of ½ each (FIG. 3a);

Then, when the potential reciprocity scores resulting from the three nodes of T1 are 0.25, 0.5 and 0.25 (see below), the nodes of U1 obtain the scores 0.11, 0.33, 0.33, 0.11 and 0.11 respectively (FIG. 3d).

The potential reciprocity score of each token of each set (T1, etc.) is (re)calculated using the formula (F) consisting of dividing the sum of the tribe scores of the nodes of the corresponding set (U0, U1, etc.) using this token and the (or at least one of the) token(s) T0 by the sum of the tribe scores of the nodes of the corresponding set (U0, U1, etc.) using this token or the (or at least one of the) token(s) T0.

Thus, in the example of FIG. 3, initially the tribe scores of the elements of U0 being 0.5 each (FIG. 3b), the respective potential reciprocity scores of the elements of T1 are 0.5/2=0.25, ½=0.5 and 0.5/2=0.25 (FIG. 3c). Then, once the scores of the users U1 have been calculated, here being 0.11, 0.33, 0.33, 0.11 and 0.11 (see above), then by applying the formula F (see FIG. 3e):

the first token of T1 has 2 users, only 1 of which uses T0, and its score is therefore (0.11/(0.11+0.33))/1.51=0.17;

the second token of T1 (this is T0) has 2 users, both using T0, and its score is therefore (0.33+0.33)/1.51=0.44;

the third token has 3 users, only 1 of which uses T0, and its score is therefore (0.33/(0.33+0.11+0.11))/1.51=0.39.

The above calculations are iterated alternately towards the user nodes, then again towards the token nodes, each time with enlarged sets Un, Tn, until convergence, that is to say until both the new obtained scores no longer differ significantly relative to the previous iteration and the new added nodes do not have significant scores (use of appropriate thresholds).

Advantageously, during these iterations, when a token has a very high potential reciprocity score (above a given threshold), it is inserted into the starting set T0.

The sets in question and the scores of the nodes of these sets are updated incrementally (during purchases/sales of token units by users with scores deemed sufficient) or regularly, and the "raw" score values calculated as described above are weighted according to the volume of transactions (number of units purchased/sold) and by further weighting the tokens that were most recently purchased/sold.

Advantageously, said weighting is carried out by taking account, in the volumes only (or more strongly), of the exchanges comprising purchases of token units for the purchase of products supplied by the nodes of these tokens and according to the amount of these purchases (units burned in fine, in return for reserve units given to the provider, as already described).

Advantageously, said weighting can also be carried out as a function of the own RR of the token bought/sold in question (higher weighting for a larger RR) and/or as a function of appreciation or reputation scores (for example the number of "Likes" in a social network or the like).

When purchasing units of a given token, the node of the latter lends reserve to the tokens (which have a reserve deficit) according to the scores established as above (scores tending to indicate that when they will be bought in turn, they will automatically "return" this reserve to it if it is itself experiencing a reserve deficit—this is the meaning of the term "potential reciprocity").

Advantageously, the long-term frequency of purchases/sales of tokens by users is also taken into account in the weightings, and purchases/sales appearing to be exceptional are ignored or given less weight; other rules (or configuration parameters) regarding the weighting, the amounts loaned, etc., can be applied in addition, so that the loans really tend to compensate each other (which can be implemented by self-learning), and—in order to implement a simple protocol in P2P (the token nodes determining the loans to be performed in a decentralized manner)—either a token node only assigns scores to tokens whose nodes apply the same rules as it (the other tokens having a zero score), or (or additionally) means are implemented to adjust the score calculations (and the loans) carried out at each token node by coordination with the other nodes according to rules adopted and implemented jointly.

Advantageously, said loans by a given token node are endorsed at the time of the purchase of tokens (from this given node) used to purchase products supplied by this node and are adjusted in proportion to the amount of this purchase (see above the embodiment in chapter 2).

A portion of the loaned amounts is explicitly returned during conversions to a "Voucher token" as we saw in the embodiment of chapter 2.

Advantageously, finally, each token is also associated with a "Worth score" that decreases with sales and increases with purchases of this token according to the "RBT method," and which can be determined simply from the value of the token that would be obtained by applying the "RBT method" or the Bancor formula (without the above arrangements). The "Worth scores" are stored in association with the times at which they were calculated. Taking the Worth score into account makes it possible to adjust the attenuation obtained owing to the mechanism described in the above as follows: we understand that, following a recent decrease in the reserve of a token causing its decrease in value, other tokens lend it reserve in order to cushion this decline (decreasing over time) as described above; but if its Worth score falls, subsequent reserve loans fall even more, which will attenuate the decline less. This avoids overly correcting fluctuations in the intrinsic value of the product(s) corresponding to the token or the capacity of the producer who issues the token: reserve loans between token nodes only mitigate temporarily and tend to smooth out fluctuations in value.

Tribe scores can be used for different applications, being representative of the relationship between a user node and its environment (some of these were seen in the previous chapters).

Variant: Adjusted Prices

In this variant, the system further comprises means for simulating controlled transfers of reserve account units between token nodes so as to obtain simulated values of the token units corresponding to their respective simulated reserve, said simulated values having attenuated fluctuations, and means for carrying out transactions on said simulated values.

The simulated values are for example weighted by tribe scores.

Furthermore, advantageously, the means for carrying out transactions on said simulated values are capable of determining price adjustments based on differences between real values and simulated values, and of compensating for all of the adjustments.

More precisely, according to this variant, in order to further limit the drawbacks of fluctuations, it is possible to take advantage of the smart contract at the user nodes: the fluctuations in the values of the tokens are ignored by users when they exchange tokens for their current purchases, and it is the values determined "in the tribe" that are considered instead. This can be implemented in the following way: the token nodes do not lend reserve, but determine and store the value that the tokens would have if they did (by simulating the loans according to the method described above)—value called "simulated price"—and their users exchange token units according to their simulated prices weighted by the respective tribe scores of these users, the price differences thus obtained compensating for each other during exchanges.

More precisely, during each purchase or sale of units of a given token, the node of this token indicates an "adjusted price" to the user which is equal to the "normal price" of the token (according to the "RBT method") adjusted by applying the difference between the normal price and the simulated price weighted by the tribe score of the user for this token node, with one constraint to be respected: said adjustments compensate each other (with a certain allowance) during exchanges.

Here again, advantageously, to avoid purchases/sales for speculative purposes, the exchanges carried out according to this variant are endorsed at the time of product purchases (by paying with the purchased token(s)) and if necessary readjusted in proportion to the amounts of these purchases (see in chapter 2 the detailed steps of payments to providers).

Such necessary exchanges during purchases can be made transparent for the user: the purchase of a product from a "token1" node triggers, on the purchasing user node, a process for exchanging token units in order to acquire the token1 units that may be missing for this purchase: the token nodes owned by the user and which are likely to be exchanged to make this purchase, declare their "adjusted prices" to the user's node according to the respective tribe scores of the latter among these token nodes; the user's node generates a combination of purchases/sales with such adjusted prices to make the exchange so that the adjustments offset each other and he has the token1 units necessary for his purchase—for example, if the adjustment is favorable to him on the purchase side of the token (the price of this token is currently increasing), the adjustments on the sale side will be unfavorable for him as well (the prices of at least some of these tokens being on the decline).

As already noted, the underlying system implementing the smart contracts guarantees the integrity of these processing operations by token nodes and user nodes in combination.

This variant offers the advantage of not biasing normal token prices during arbitrages taking advantage of fluctuations in the token price on external markets as mentioned in the preamble (see the white paper already cited). It can be seen as complementary, in particular in addition to reserve loans between token nodes in order to attenuate their value fluctuations (as described above), by this variant the remaining fluctuations are ignored by the users of the tribe during their exchanges of tokens for their everyday purchases. Thus, advantageously, this variant is combined with the method described above, for example the loans between token nodes are made for 20% and the price adjustments according to this variant for 80%.

Variant: Other Accepted Tokens

Instead of considering as in the rest of the text that, to acquire a product from the issuer of a given token (the provider), the user transfers units of this provider's token to him, the user transfers units of one (or more) other token(s) to the provider having a high potential reciprocity score compared to the providers token (up to the amount of the purchase in question, expressed in common reserve units).

According to this variant, the smart contract of the provider node does not immediately liquidate the units received from said other token (so as not to lower its price). Advantageously, the nodes of the tokens having a high potential reciprocity score with the provider cover it against the risk of a drop in their value. The enforcement of such a cover can take several forms, including in particular the token support (see above the embodiment of chapter 6).

Thus, in one embodiment of this variant:
the length of possession of said other tokens (or a rule to determine the time of their liquidation, if applicable) is set in the smart contract and
"support tokens" are issued by each token node to cover the nodes with a high potential reciprocity score compared to its token (or to cover the nodes in which the latter has a high score). Insofar as these nodes buy support token units, they are covered in relation to said drop in value (the "triggering event" of the support here is the price drop of said other received token, noted at the time of its liquidation, and the damage due to this decrease is compensated for upon consumption of said units, as described in chapter 6). Conversely, these nodes could buy support token units automatically in the event that said other received token increased its price when they liquidate it, the increases in value of said other token thus tending to compensate for the losses of support token units caused by the decreases in value of said other tokens.

It is understood here that each provider node is thus insured by a plurality of other nodes (those with a high potential reciprocity score), which makes it possible to spread out the risks in the network of token nodes described above.

Finally, we can also consider the case where, instead of transferring units of another token to the provider having a high potential reciprocity score compared to the providers token, the user transfers units of another token to the provider that are expressly accepted by the latter (up to the amount of the purchase in question, expressed in common reserve units) and the covers of the risk of a fall in value of this token are implemented on a customized basis (by support token or other arrangement). Typically, the expressly accepted tokens can be those of other providers from whom said provider intends to make purchases soon.

Said other accepted tokens can be exchanged on an "exchange market," according to the following method:

Beforehand, the node willing to exchange tokens must communicate what it seeks to exchange to other nodes (typically, automatically to nodes having a high potential reciprocity score), the latter forming said exchange market.

To do this, the user declares an 'Amounts+' set including the information for the token units that he is willing to sell and an 'Amounts−' set comprising the information for the token units that he is looking for in exchange.

The counterparts required for these amounts to be exchanged are also declared. Thus for each 'Amounts+' token there is a price in units of at least one reference token (at least in units of the reserve token of the node in question) and for each 'Amounts−' token there is a maximum acceptable cost of at least one reference token (also at least the reserve token).

The exchange market is thus a network of nodes with which 'Amounts+' and 'Amounts−' are associated, network whereof each edge (between two nodes) is a correspondence of Amounts of opposite signs for the same token. Thus, between two nodes there are as many edges as there are tokens for which there are on both sides of the 'Amounts+' and 'Amounts−' that are compatible in terms of price sought. (The edges are stored and updated by the nodes at the ends of these edges or recalculated dynamically on request.)

More precisely, each edge is associated with:

the token in question;

the exchangeable amount (capacity within the meaning of flow networks) by matching Amounts+ and −. It is the minimum of the amounts of different signs indicated on either side of the order for this token in the case where the price on the 'Amounts+' side is less than or equal to the maximum acceptable cost on the 'Amounts−' side (expressed in reference token units); and the units (expressed in reference tokens) to be compensated for this exchangeable amount (=exchangeable amount x price on the 'Amounts+' side).

To take a purely illustrative example where the declared prices and costs are declared relative to the same reference token, the exchange market, seen as a flow network, makes it possible to exchange different token units between a node 'A' and a node 'B':

by determining the paths for transfers maximizing the units transferred in the 'A' to 'B' direction, as well as in the opposite direction ('B' to 'A'), and by transferring token units at minimum between these two directions, these transfers resulting in the maximum possible exchange taking into account the 'Amounts+' and the 'Amounts−' declared by 'A' and 'B'. (In practice, the flow networks include load balancing means which are known and those skilled in the art can draw inspiration from them.)

These latter variants can advantageously be combined with the preceding ones at the time of liquidation to attenuate the price variations (and the triggering of supports resulting therefrom).

In summary, the system according to this embodiment tends to smooth, even neutralize, the fluctuations in value of the tokens during token exchange transactions that are "local", the locality of a token being represented by its potential reciprocity score ("locality" relative to the token node that calculates this score). This is obtained:

either at the smart contract on the token nodes, by a reserve transfer between token nodes (each node which generates token units, and which therefore sees its value rise, transfers units from its reserve to tokens having (with respect to it) a strong potential reciprocity score and having decreased in value; as a result, the latter go up and the former goes down but tends to be compensated automatically by the latter, which do the same in turn, because of their reciprocities);

or at the level of the smart contract on the user nodes—these can, based on their scores, exchange the tokens according to "adjusted" prices set by the smart contract on the token nodes (by simulating the prices as if the reserve transfers had taken place), these adjustments having to compensate for one another;

or at the smart contract on the token nodes, these accepting the tokens of the nodes having a high potential reciprocity score automatically (or accepting them selectively, periodically or semi-automatically), at their current conversion value, for a given duration (agreed upon in the contract) and with possible coverage by other nodes, the latter advantageously being those of the tokens with high potential reciprocity scores (coverage implemented by design, automatically); the tokens thus accepted can be exchanged at any time on a local token exchange market (these different approaches can be combined).

Thus, this invention also aims to make it possible to give tokens issued individually the advantage of complementary currencies (also called local currencies, community currencies, tribal currencies, etc.), the latter additionally being freed from the constraint of the "local" (understood here in the geographical sense), which solves many technical problems.

Other mechanisms using the idea of this invention could be implemented by those skilled in the art, in particular, a method for arbitrating between the exchange market and the RBT method. The steps of such a method are essentially the following: depending on the price of the tokens according to the RBT method, continually updating the prices on the 'Amounts+' (essentially keeping them slightly above the prices according to the RBT method) and the maximum acceptable costs on the 'Amounts−' (keeping them slightly below) and, as soon as an exchange transaction is triggered on the exchange market (as described above), immediately triggering the reverse exchanges according to the RBT method.

Chapter 9Bis-"Neo-Barter" System and Bartering by "Pretokens"

According to this embodiment, a first provider node associated with a token node of a first type of token is a provider node with respect to a first user node that is also a second provider node associated with a token node of a second type of token, including means for determining the existence or prospect of existence of reverse transactions where the first provider node would be a user node at one end and the second provider node would be a provider at the other end, if applicable via other provider nodes, and, depending on the characteristics of these actual or planned reverse transactions, transferring a given quantity first token units to the first user node from the first provider node in return for a simple transfer of reserve account units corresponding to this given quantity of first token units, in order to allocate this payment to the reserve.

According to optional features:
for the other user nodes, the first token account units are obtained for their real value (P);
the volume and frequency of transfers of account units in return for reserve account units are only linked to the volume and frequency of transactions in the reverse transaction chain;
the system includes means for modulating the amount of the transfer between the reserve value and the real value as a function of the length of the chain of reverse transactions.

This embodiment aims to ensure that tokens (mainly seen here also as "vouchers") can be generated and "exchanged" automatically between "local" nodes supplying products ("local" not necessarily in the geographic sense, but proximity in the network, with a connotation of reciprocity as described below) in order to have the advantages of a community currency, but without having to create a community token and without presenting any limitation of extensibility, such as at a geographical level.

The idea here is that, insofar as nodes are the usual providers for each other in a more or less reciprocal way (directly or indirectly in the network), they can, by exchanging tokens in advance, set up a sort of advanced bartering ("neo-barter") that softens the constraint of the "double coincidence of wants" (https://en.wikipedia.org/wiki/Coincidence_of_wants), with the advantage that the exchanged tokens are generated not at the current price P in force (determined by the RBT, see the Bancor formula), but by adding reserve according to the RR ratio only (i.e. by adding just enough reserve not to want to vary their price), the imbalance (i.e. the price P times the difference between the RR ratios in the case where the RRs are different) being compensated by direct transfer of what is not put in the reserve for the one on whom the lowest RR is imposed.

To illustrate this advantage: for two given tokens both having an RR of 10%, the units thus generated need only add reserve for 10% of the value of the generated token, whereas normally (taking a price P of 1 for this token as an example), a unit of the token should be generated by adding a unit of its reserve token). We therefore saved 90% of the necessary input here.

In the case where the RRs are different, for example RR1=30% and RR2=10%, the first node provides 10% (RR2) in the reserve of the second and directly transfers 20% to the second (total contribution 30%), and the second node provides 30% (RR1) in the reserve of the first. The actual contribution is then equal to the greater of the two reserve rates, and remains lower than the price P.

Figure 5:
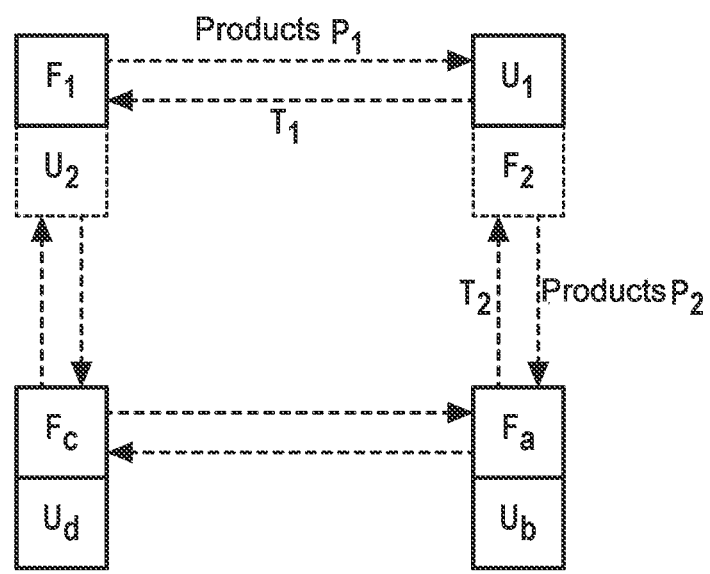
FIG. 5 is a block diagram of potential transactions in a transactional system with special conditions for receiving account units based on reciprocity.

With reference to FIG. 5, the actual or potential reciprocity (supplies in opposite directions) of supplies between a provider node F1 and a user node U1 is determined by means of an algorithm which, on each provider node, identifies characteristics of the "usual" supply chains, which start from node F1, this time as user U2, and which end at node U1, this time as provider F2, if necessary via other nodes which are at the both provider and user. The essential characteristic is the length of this chain (a short chain being an index of a reliable reciprocity), the amounts, frequencies, etc. also being taken into account. In the case where there are several chains, the characteristics of the different chains are advantageously combined.

The volume and frequency of the transactions in the chain determine the volume and frequency of tokens available at the price RR.

Other characteristics (in particular geolocation for local businesses) can also be taken into account.

If this reciprocity is at a sufficient real or potential level, the node U1 can benefit from tokens from the node F1 by paying a "local price" corresponding to the reserve RR only of the token of the first node, price which is put in this reserve, and not the normal price P of the other users.

If the characteristics of the chain(s) lead to a lower reciprocity (real or potential), advantageously the system sets a local price midway between RR and P. This approach must of course be symmetrical at both nodes.

The actual or potential reciprocity can be characterized by accessing a transaction history and/or other account unit requests under the preferential conditions as explained above, which history is accessible via the P2P network and preferably stored in distributed and, if necessary, duplicated manner. To do this, we implement a process of traveling through the transaction network (essentially consisting of a graph with volume and frequency factors at its arcs) to identify the reverse transaction flows in this network, their characteristics serving to determine the intensity of the reciprocity in question. To avoid making the process cumbersome, we limit this network journey (maximum number of nodes traveled, minimum volume or frequency of a link (arc), possibly with a combination of these factors—for example, we travel the network starting from a given link that is that much further when the volume and/or frequency along this link is high), in particular for the first search for reverse transactions.

Furthermore, in order to facilitate this search, it is possible to store information at a node relative not only to its links with immediately adjacent nodes, but also to the links of nodes immediately adjacent to other nodes, and so on.

In addition, when a reverse transaction path is found, the method can look for sections parallel to portions of this path, so as to somehow thicken this path with pieces of alternative routes.

The system according to the "neo-barter" embodiment making it possible to acquire vouchers without (or with fewer) reserve tokens in the presence of reciprocity circuits, this embodiment lends itself particularly well to a deployment in an environment (a community, a local market, etc.) where there is a high density of reciprocal circuits, since there will be less need for reserve tokens in order for the system to operate.

For the practical implementation of this process, the person skilled in the art can also refer to the known techniques implemented in flow networks.

The implementation of token nodes generating token account units can advantageously be carried out according to chapters 2 to 6.

Variant—Indirect Barter Circuits (Pretokens)

It is possible to implement the above "neo-barter" embodiment even without statistics when token units (vouchers) are purchased for a supply in the future. Because the period of time between the purchase of the token and the supply in question makes it possible to detect circuits of reciprocity.

So far, we have only focused on a user who wants to obtain tokens, such as "baguette" tokens, "rice" tokens, etc., and who takes the initiative to buy them. But often the opposite happens: each node will receive proposals such as "will you buy my own tokens or tokens x, y or z in exchange for my purchase of tokens for your product?" or more generally: "do you want to buy x, y or z tokens to form (close, complete) an indirect barter circuit?"

Indeed, if an indirect barter circuit cannot be formed, and if the buyer does not have enough reserve token units to pay, the transaction cannot be done (paying refers to paying at the price P of the Bancor formula, or at a lower price—in (RR+IH)*P, that is to say without paying the pre-financing or paying it only in part—if chains of reciprocity have been detected, as described above).

Advantageously, each node publishes the list of tokens and their amounts (the number of token units) in advance that it is prepared to accept in indirect barter circuits, and exchanges can thus be triggered automatically, if necessary, to close barter circuits. Generally it will be tokens for current needs (of commonly purchased products, such as electricity, water, rice, etc.) which will be more frequently accepted to close the circuit.

One advantageous embodiment is now described by means of "pretokens." A pretoken is relative to (associated with) a particular token and does not require reserve units to be acquired. The goal is to form, with units of other pretokens (acquired by other nodes), an indirect barter circuit.

To find out whether an indirect barter circuit exists, it is expected that at the request of a user node for a given amount of units of a relative pretoken (associated) with a given token, the token node of said token generates pretoken units and propagates, in P2P, the information elements necessary to form the indirect barter circuit sought.

When such a circuit has been generated, the pretokens are replaced by vouchers for supply (as are the tokens, except that these vouchers cannot be returned to the smart contract, since they are not based on a reserve), vouchers which are themselves destroyed upon the supplies (as is the case for the tokens, but the provider does not receive anything more here because no corresponding reserve existed).

On the other hand, in the case where an indirect barter circuit could not be generated after a given time interval (predefined in the smart contract, before delivery), the units of the pretoken can be automatically replaced by units of the token with which the pretoken is associated, against payment (transfer to the token node of reserve token units) at a price depending on the detection or non-detection of reciprocity chains, as described above. If such payment is impossible, the transaction fails and the pretokens are lost.

This variant has the advantage, even for immediate or quasi-immediate supplies, of allowing a user who does not have spare units to obtain this supply, provided that the system is capable of quickly identifying the existence an indirect barter circuit.

This constitutes an additional factor for the adoption of the system by the providers, because even in such circumstances a supply in return for consideration will take place. In addition, this encourages each provider to create their own token in order to benefit from the detection of indirect barter circuits.

Chapter 10—Reciprocity and Networked Insurance with Automatic Reinsurance

In this embodiment, the system uses the same algorithm for determining potential reciprocity scores as that of chapter 9, but on token nodes of support tokens within the meaning of chapter 6, and implements reinsurance commitments in the smart contract of the automatic reinsurance commitments towards the nodes with high scores.

The automatic reinsurance commitments are set up by nodes whose potential reciprocity scores are above a certain threshold and, advantageously, the height of the automatic reinsurance commitment can be a function of the obtained score.

Thus, a reinsurance commitment is automatically provided by each support commitment provider to support commitment providers who are "adjacent" within the meaning of the scores obtained for them by the latter.

Advantageously, the degree of adjacency is adjusted, by learning, to better correspond to the needs of the real world—for this we will take the concrete example outlined in chapter 6: "the blocked asset" is a supply of care, and the mechanism of this invention makes it possible for a care provider unable to provide it (e.g. lack of bed for hospital care) to be compensated by another care provider (a nearby hospital) to provide the care in question."

As already described in chapter 6, the smart contract of a node which is the beneficiary of a reinsurance commitment (here it is an automatic reinsurance commitment) may, when its own blocked assets are exceeded, directly draw on the blocked assets of the provider of this commitment (hereinafter called "automatic reinsurer node").

However, advantageously, the smart contract can also draw on the assets of another automatic reinsurer node according to its "need for supply," that is to say which more directly offers the specific supply sought (for example hospital care in general, hospital care of a certain type, etc.).

Thus (using the same example), the present invention aims to ensure that, in the event that the blocked assets (care units To1) are exceeded, the smart contract selects, from among the neighboring nodes, sorted by decreasing potential reciprocity scores, the first one that has specific corresponding reserve token units (hospital care units, To3—possibly units of a certain type of care) available in their blocked assets.

Advantageously, the choices of reinsurers by the beneficiary nodes are taken into account by the algorithm for determining the potential reciprocity scores, by learning, so as to gradually propose automatic reinsurer nodes that will be accepted directly.

In one embodiment, a "specificity weight" (or several different weights, for different types of replacement needs, insofar as they are captured in a semi-automatic embodiment) is (are) associated with each automatic reinsurer node and incremented during each selection, and the potential reciprocity scores are weighted by means of the specificity weight(s) of the automatic insurer nodes with which they are associated (the different specificity weights making it possible to refine the selection according to the type of specific current supply need).

Chapter 11—Interactions with Other Input Data

The system described in the above, through smart contracts, can interact with different input data received or picked up by the nodes of the system.

In particular, the system may include "attesting" or "certifying" nodes comprising physical means (sensors, actuators, etc.) making it possible, for example, to certify that a product from a provider owning a provider node has been supplied to a user who owns a user node. This certifying node can for example be held by a delivery organization, or integrated into a mailbox detecting, for example by NFC technology, the actual deposit of the product in the box.

As a variant, this functionality can be integrated into the smart contract of the user node.

In another embodiment, the received data can be location data (GPS or other), possibly secured by means of an envelope protection device as described in application PCT/IB2018/059003 filed on Nov. 15, 2018 in the name of the applicant, the content of which is incorporated into the present description by reference, or by known "Proof of Location" mechanisms using the blockchain, see for example https://docs.xyo.network/XYO-White-Paper.pdf.

This GPS data can for example be combined with time data.

This GPS data can be compared with the coordinates of one or more geographical areas in which (or for access to which) it is necessary or desirable to hold a certain token, if necessary a minimum number of units of this token.

We can associate a loading constraint with this geographic verification in the considered node (typically a user node) of a certain smart contract making it possible to trigger the reception of this token.

For example, in the case of a motorway toll by national flat rate with a certain period of validity (e.g. Switzerland), the following operations can be planned, executed in a smartphone provided with means for secure execution of smart contracts:

upon arrival in the country, detecting the change in cellular network in response to this detection, manually or automatically loading a smart contract for receiving "highway toll" token units executing the smart contract to receive, by reserving reserve account units, X units of this token, to which an expiration date is assigned, implementation by the smart contract, automatically or on demand, of an output interface, typically visual on screen, proving the possession of X token units in particular to the authorities.

A first advantage of the invention is to regulate the cost of the toll, either by leaving it invariable or by controlling the variations in cost by varying the IH factor (thereby regulating motorway traffic). A second advantage is that it makes it possible to return unused tokens (in this case a fraction of the X token units depending on the length of stay), or even to exchange them with other tokens.

Chapter 12—Token Refunds and Debt Management

In this embodiment, it is provided that the smart contract executed in a token node is capable, prior to a return of token units to the given token node, of verifying the availability of the reserve account units that had been transferred to the provider node when receiving these token units and, based on this verification, performing the return within the limit of the available reserve account units, and is also capable of assigning the provider node an attribute of remaining debt of reserve account units in the event of at least partial unavailability.

Optionally:

the smart contract is adapted, during a subsequent transaction providing for a transfer of reserve account units to a provider node having such an attribute of remaining debt, to transfer all or part of the reserve account units to be transferred for this subsequent transaction to the user node at the origin of said return, to at least partially complete the latter;

the system includes means for associating the attributes of the remaining debt of the provider nodes with other attributes of these nodes, so as to dissociate these attributes from the key pairs of said nodes.

The recording of debts with respect to the various user nodes is advantageously carried out by the smart contract executed in the token node in question.

In this way, the system guarantees that a debt having arisen during an incomplete return operation ends up, as other users buy this same token, being reimbursed to the creditor user.

Furthermore, to prevent debts from being purely and simply erased from the system during the default or disappearance of the considered token node (which it will be recalled can be combined with the associated provider node), provision is made for user nodes, typically a set of user nodes which have high tribe scores compared to the credit user nodes, that store the debt data not (or not only) in association with the pair of keys of the token/provider node in question, but (or further) in association with attributes that permanently characterize the provider.

In this way, when a provider reconstitutes a token/provider node following a default/disappearance, a recovery mechanism, managed by the smart contract, is enforced as soon as a link with the users is established. This mechanism advantageously includes an automatic notification to all of the user nodes, when the new token/provider node is established, of its public key and attributes key making it possible to find these attributes.

Depending on the nature of the provider, these attributes can be of variable nature (for example the coordinates for a local business).

Of course, the inventions described above are not limited to the described embodiments, but the person skilled in the art can bring numerous variants and modifications thereto, just as he can perform any combination between the features of the different inventions that he will understand as being technically compatible.

Notably, in particular the calculation of the quantity of reserve units which go into the reserve strictly speaking of a token node, we can replace the formula $RR*n$ or $(RR+IH)*n$, which is an affine function, with other functions which may or may not be affine. In particular, we can implement a non-linear function (in stages, or continuous), which contributes to stabilizing the value of the token.

The invention claimed is:

1. A network transactional system, comprising a set of token nodes (TN), a set of user nodes (UN) and a set of provider nodes (PN), the nodes being capable of performing transactions by executing a smart contract allowing a user node to obtain token account units (Voucher tokens) by reserving (R) reserve account units according to a value of the token units which itself varies according to the reserve, the number of token units in circulation and the reserve ratio (RR), with each token node being associated with a provider node and the token being representative of a product or asset (good, service, right or other benefit) of the provider, or of a group of such products or assets, the system being capable, when a user node provides reserve account units necessary to obtain token units from a given token node at the current value, of transferring a first portion of these reserve account units to the reserve of said given token node, and of transferring a second portion of these reserve account units outside said reserve, and performing reverse transfers when token units are returned to the given token node, so as to limit or neutralize the value variations of the token unit when these token units are received and returned.

2. The system according to claim 1, wherein a first provider node associated with a token node of a first type of token is a provider node with respect to a first user node that is also a second provider node associated with a token node of a second type of token, and further comprising a reverse transaction detection sub-system configured to determine the existence or prospect of existence of reverse transactions where the first provider node would be a user node at one end and the second provider node would be a provider at the other end, possibly via other provider nodes, and further configured, depending on the features of these actual or planned reverse transactions, to transfer a given quantity first token units to the first user node from the first provider node as a counterpart of a simple transfer of reserve account units corresponding to this given quantity of first token units, in order to allocate this payment to the reserve.

3. The system according to claim 2, which is adapted, during the supply of a product of the good or service type by the provider, to delete the corresponding token units by transferring the first portion of the reserve account units to the provider node and, if it has not already been transferred there, the second portion of the reserve units.

4. The system according to claim 3, including product delivery certification nodes capable of communicating with the token nodes to selectively delete all or part of the token units and to transfer all or part of the first portion of the reserve account units to the provider node and, if it has not already been transferred there, the second portion of the reserve units, according to a verified or certified supply status of the product corresponding to a user.

5. The system according to claim 4, wherein the certificate of delivery node and the user node of the concerned user form a single node.

6. The system according to claim 2, also including, wherein a user node is configured to cause units of a certain token associated with this location to be received in response to geographic location information.

7. The system according to claim 6, which is further configured to load a smart contract into the user node in question enabling this reception.

8. The system according to claim 6, wherein said units of the certain token are associated with time data, such as a period of validity.

9. The system according to claim 6, wherein the fraction of account units defining said first portion is variable, so as to vary the price of the certain token associated with the location, in particular for regulatory purposes.

10. The system according to claim 2, wherein, for the other user nodes, the first token account units are obtained for their real value (P).

11. The system according to claim 2, wherein the volume and frequency of transfers of account units as a counterpart of reserve account units are only linked to the volume and frequency of transactions in the reverse transaction chain.

12. The system according to claim 2, further comprising a modulation sub-system configured to modulate the amount of the transfer between the reserve value and the real value as a function of the length of the chain of reverse transactions.

13. The system according to claim 2, wherein the determination of the existence or a prospect of existence of reverse transactions where the first provider node would be a user node at one end and the second provider node would be provider at the other end, possibly via other provider nodes, is implemented with "pretoken" type tokens that do not require reserving reserve account units.

14. The system according to claim 13, further comprising a token request sub-system configured to request that tokens are obtained by reserving reserve account units when no expected chain of reverse transactions with pretokens is detected.

15. The system according to claim 1, wherein a token node and an associated provider node consist of one and the same node.

* * * * *